United States Patent
Bowers et al.

(10) Patent No.: US 8,988,759 B2
(45) Date of Patent: Mar. 24, 2015

(54) METAMATERIAL SURFACES

(75) Inventors: Jeffrey A. Bowers, Kirkland, WA (US);
Roderick A. Hyde, Redmond, WA (US);
Jordin T. Kare, Seattle, WA (US);
Nathan Kundtz, Kirkland, WA (US);
Bruce Marshall McWilliams, Atherton, CA (US); John Brian Pendry, Cobham (GB); David Schurig, Raleigh, NC (US);
David R. Smith, Durham, NC (US);
Anthony F. Starr, San Diego, CA (US);
Clarence T. Tegreene, Bellevue, WA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 1035 days.

(21) Appl. No.: 12/804,710

(22) Filed: Jul. 26, 2010

(65) Prior Publication Data
US 2012/0019431 A1    Jan. 26, 2012

(51) Int. Cl.
*G02B 26/06* (2006.01)
*H01Q 15/14* (2006.01)
*H01Q 15/00* (2006.01)
*B82Y 20/00* (2011.01)
*G02B 1/00* (2006.01)

(52) U.S. Cl.
CPC ............ *H01Q 15/0066* (2013.01); *G02B 1/007* (2013.01); *G02B 1/005* (2013.01); *G02B 26/06* (2013.01); *H01Q 15/002* (2013.01); *B82Y 20/00* (2013.01)

USPC .......... 359/290; 359/240; 359/263; 359/245; 343/909

(58) Field of Classification Search
USPC .................. 359/290, 245, 240, 263; 343/909
See application file for complete search history.

(56) References Cited

U.S. PATENT DOCUMENTS

| | | | |
|---|---|---|---|
| 4,666,295 A | 5/1987 | Duvall, III et al. | |
| 6,466,703 B1 | 10/2002 | Ionov | |
| 6,885,779 B2 | 4/2005 | Keys et al. | |
| 7,071,888 B2 * | 7/2006 | Sievenpiper | 343/745 |
| 7,106,494 B2 | 9/2006 | Osipov et al. | |

(Continued)

FOREIGN PATENT DOCUMENTS

WO    WO 2008/069837 A2    6/2008

OTHER PUBLICATIONS

Tennant, A. and Chambers, B.; "Wind Turbine Generators with Active Radar Signature Control Blades"; Proceedings of the SPIE; pp. 486-495; vol. 5389, dated 2004.

(Continued)

*Primary Examiner* — Zachary Wilkes

(57) ABSTRACT

An apparatus to modify an incident free space electromagnetic wave includes a block of an artificially structured material having an adjustable spatial distribution of electromagnetic parameters (e.g., $\in$, $\mu$, $\eta$, $\sigma$, and n). A controller applies control signals to dynamically adjust the spatial distribution of electromagnetic parameters in the material to introduce a time-varying path delay d(t) in the modified electromagnetic wave relative to the incident electromagnetic wave.

58 Claims, 22 Drawing Sheets

(56) References Cited

U.S. PATENT DOCUMENTS

| | | | |
|---|---|---|---|
| 7,538,946 | B2 | 5/2009 | Smith et al. |
| 7,580,604 | B2 | 8/2009 | D'Aguanno et al. |
| 7,719,477 | B1 * | 5/2010 | Sievenpiper .................. 343/754 |
| 7,808,716 | B2 | 10/2010 | Lu et al. |
| 7,831,048 | B2 | 11/2010 | Kastella et al. |
| 7,928,900 | B2 * | 4/2011 | Fuller et al. ................... 342/175 |
| 8,094,074 | B2 * | 1/2012 | Frigon et al. ................... 342/372 |
| 8,130,171 | B2 * | 3/2012 | Lam et al. ...................... 343/909 |
| 8,174,341 | B2 * | 5/2012 | Lee et al. ....................... 333/219 |
| 8,179,331 | B1 † | 5/2012 | Sievenpiper |
| 2001/0038325 | A1 | 11/2001 | Smith et al. |
| 2006/0238897 | A1 | 10/2006 | Nishioka |
| 2009/0086322 | A1 | 4/2009 | Lu et al. |
| 2009/0161196 | A1 * | 6/2009 | Malfait .......................... 359/290 |
| 2011/0311234 | A1 * | 12/2011 | Almassy et al. ............. 398/182 |
| 2012/0018653 | A1 * | 1/2012 | Bowers et al. ............. 250/505.1 |
| 2012/0019432 | A1 * | 1/2012 | Bowers et al. ................ 343/909 |
| 2012/0019892 | A1 * | 1/2012 | Bowers et al. ................ 359/276 |

OTHER PUBLICATIONS

European Patent Office, Supplementary European Search Report, Pursuant to Rule 62 EPC; App. No. EP 10764783.6; May 12, 2014; pp. 1-8.

Pendry et al.; "Reversing Light With Negative Refraction"; Physics Today; Jun. 2004; pp. 37-43 (8 pages total); American Institute of Physics.

Two-Dimensional Beam Steering Surface Using an Electrically Tunable Impedance Surface, Sievenpiper et. al., IEEE Transactions on Antennas and Propogation, vol. 51, No. 10, Oct. 2003.†

A Tunable Impedance Surface Performing as a Reconfigurable Beam Steering Reflector, Sievenpiper et. al., IEEE Transactions on Antennas and Propogation, vol. 50, No. 3, Mar. 2002.†

\* cited by examiner
† cited by third party

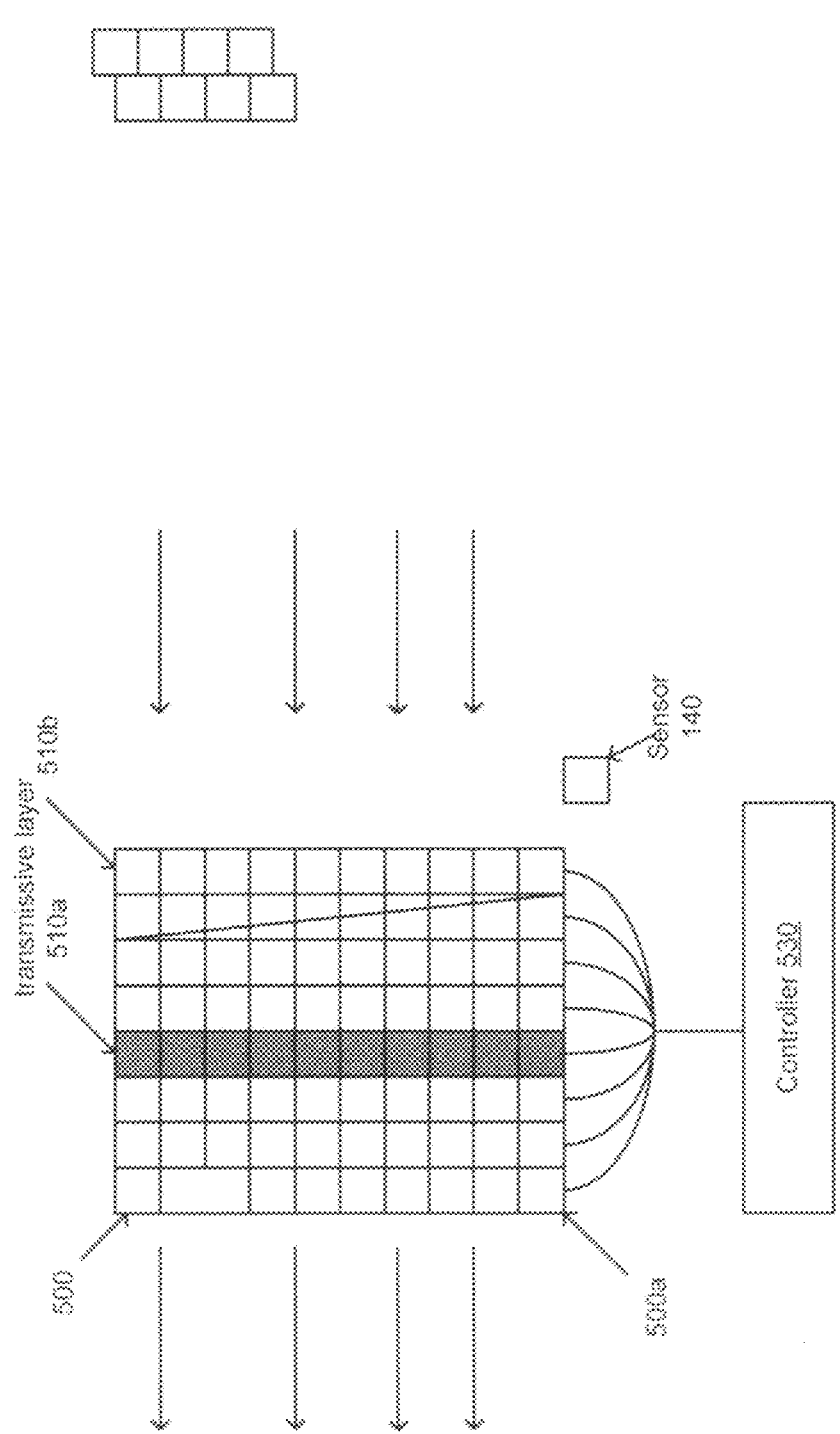

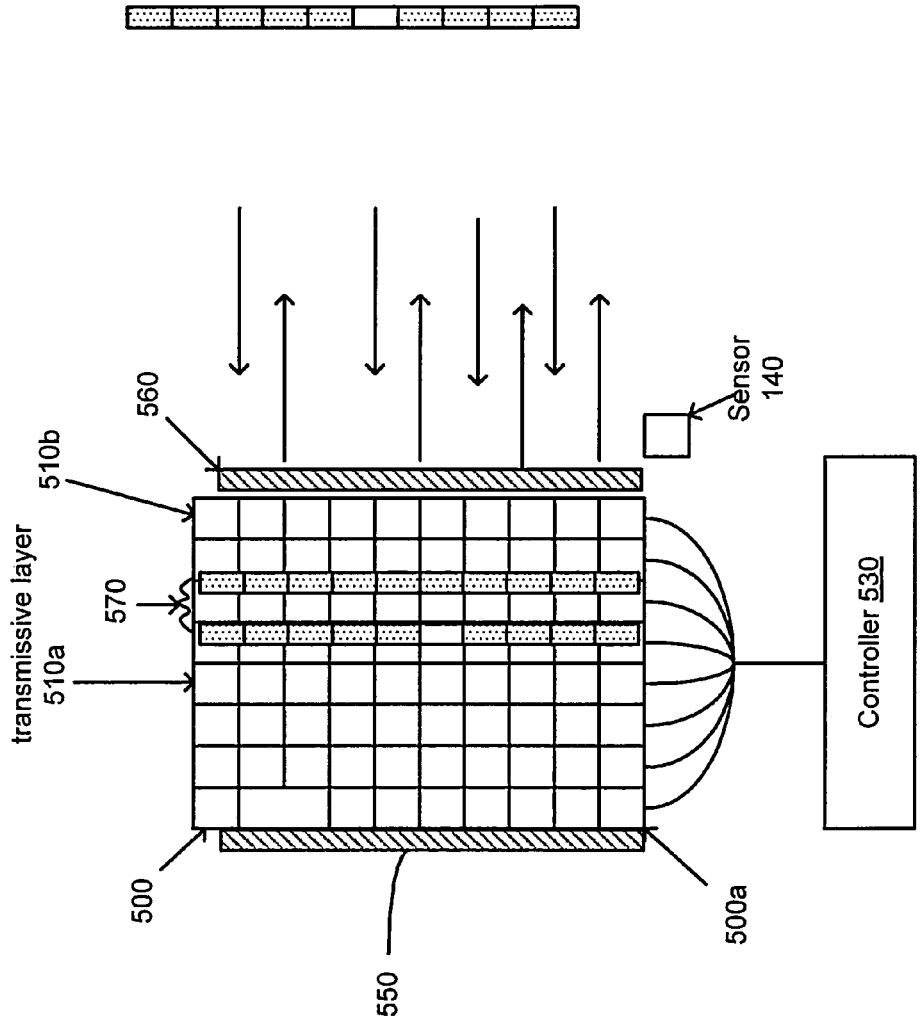

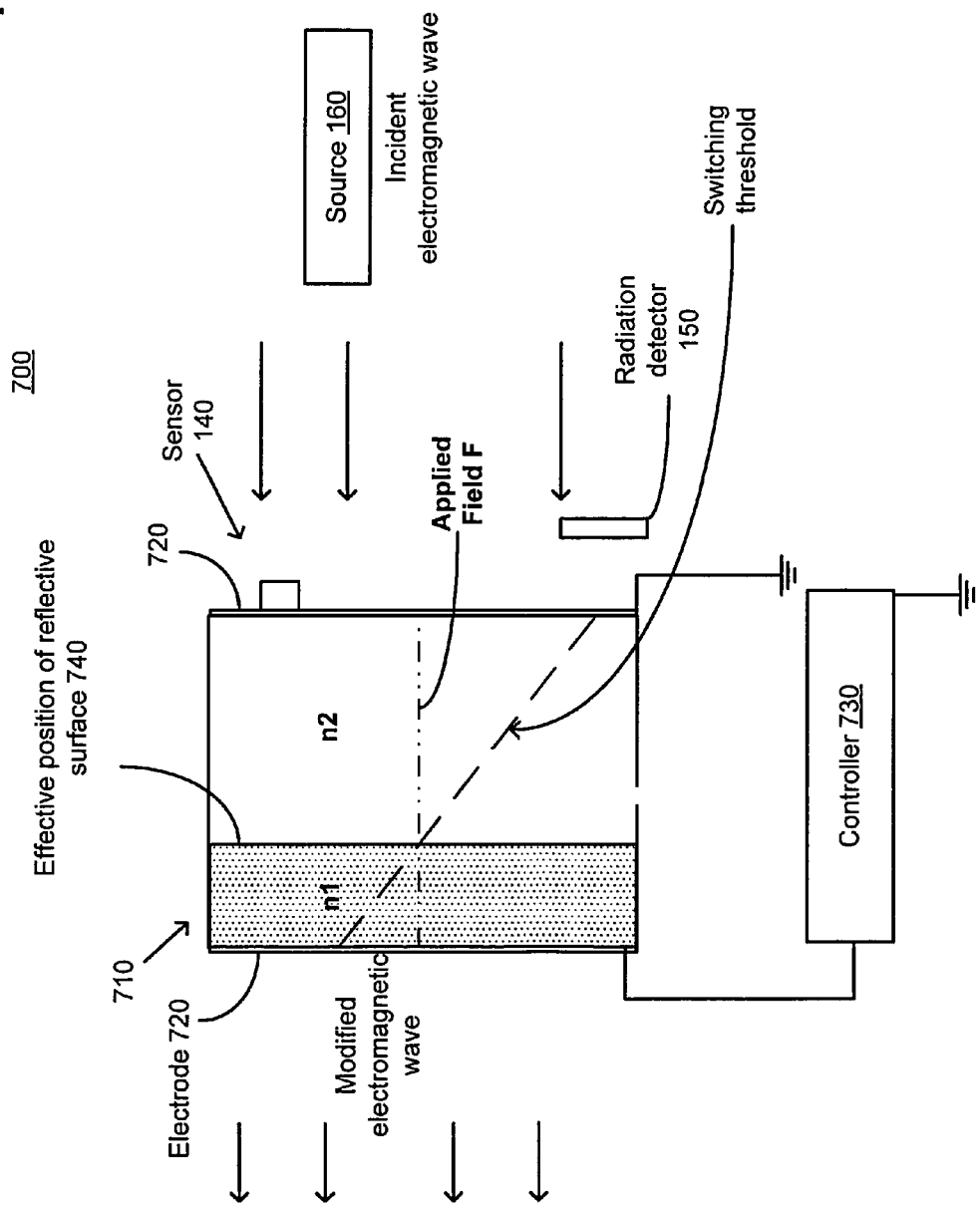

FIG. 8

810
Intercepting an incident electromagnetic wave with a stack of one or more layers having controllable reflective properties provided by metamaterial elements therein; and

820
Dynamically adjusting the controllable reflective properties of the one or more layers to present a reflective surface at varying depths and/or angles in the stack as a function of time to introduce a time-varying path delay d (t) in a reflected electromagnetic wave relative to the incident electromagnetic wave.

Method 800

FIG. 9

Method 900

910
Intercept an incident electromagnetic wave with a stack of one or more layers having controllable reflective properties 920
Dynamically adjust the controllable reflective properties of the one or more layers to present a reflective surface at varying depths and/or angles in the stack as a function of time to introduce a time-varying path delay d (t) in a reflected electromagnetic wave relative to the incident electromagnetic wave

FIG. 10

Method 1000

1010
Intercept an incident free space electromagnetic wave with a stack of one or more layers of transmissive materials, wherein the one or more layers with controllable index of refraction have controllable metamaterial elements therein [as opposed to Pockel cells, LCDs]

1020
Dynamically adjust the controllable indices of refraction of the one or more layers to at least partially transmit an incident electromagnetic wave having a frequency f, and to introduce a time-varying path delay d (t) in a transmitted electromagnetic wave relative to the incident electromagnetic wave.

FIG. 11

Method 1100

1110
Interposing an artificially structured material having a controllable index of refraction responsive to an applied field (F) in a path of an incident free space electromagnetic wave

1120
Applying a field (F) to the material to induce a spatially varying index of refraction profile in the material

1130
Temporally varying the applied field and the corresponding spatially varying index of refraction profile so as to introduce a time-varying path delay d (t) in a modified electromagnetic wave relative to an incident electromagnetic wave

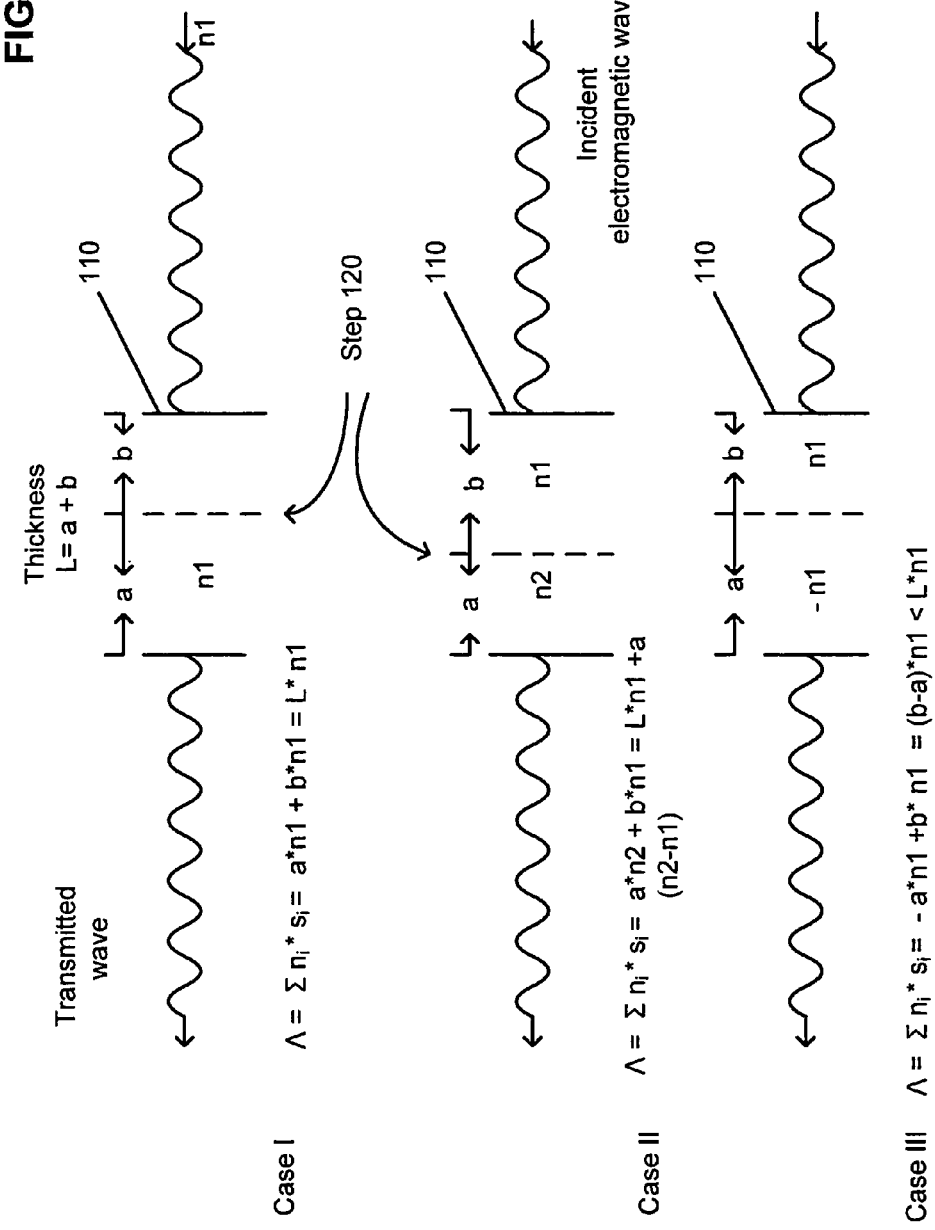

(adapted from wikipedia)

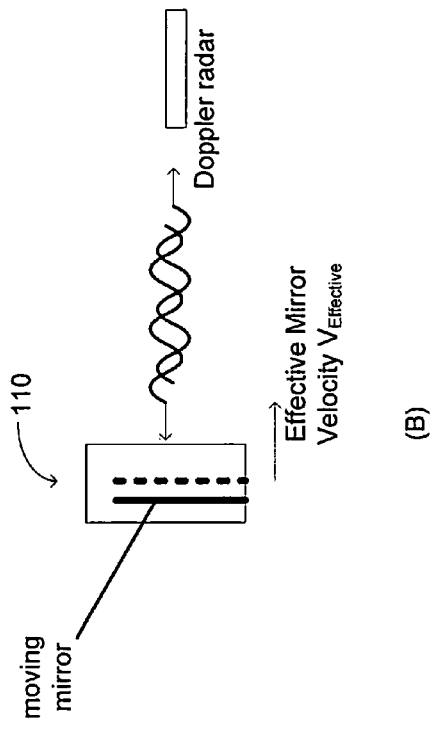
FIG. 14B
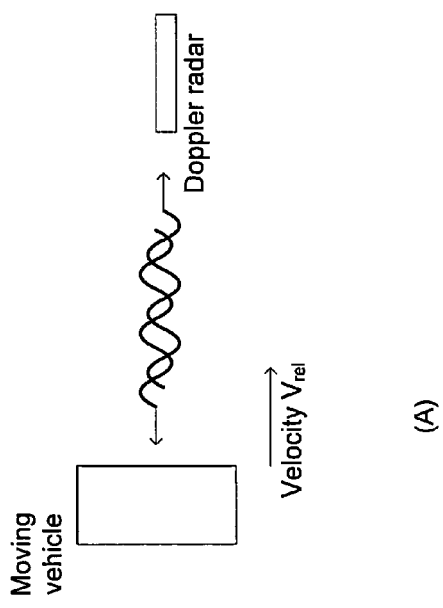
FIG. 14A
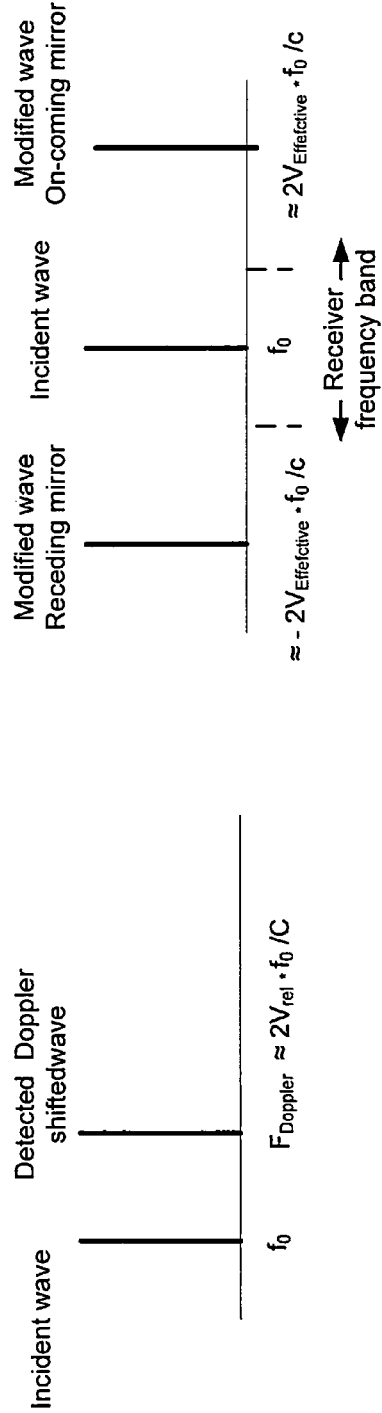

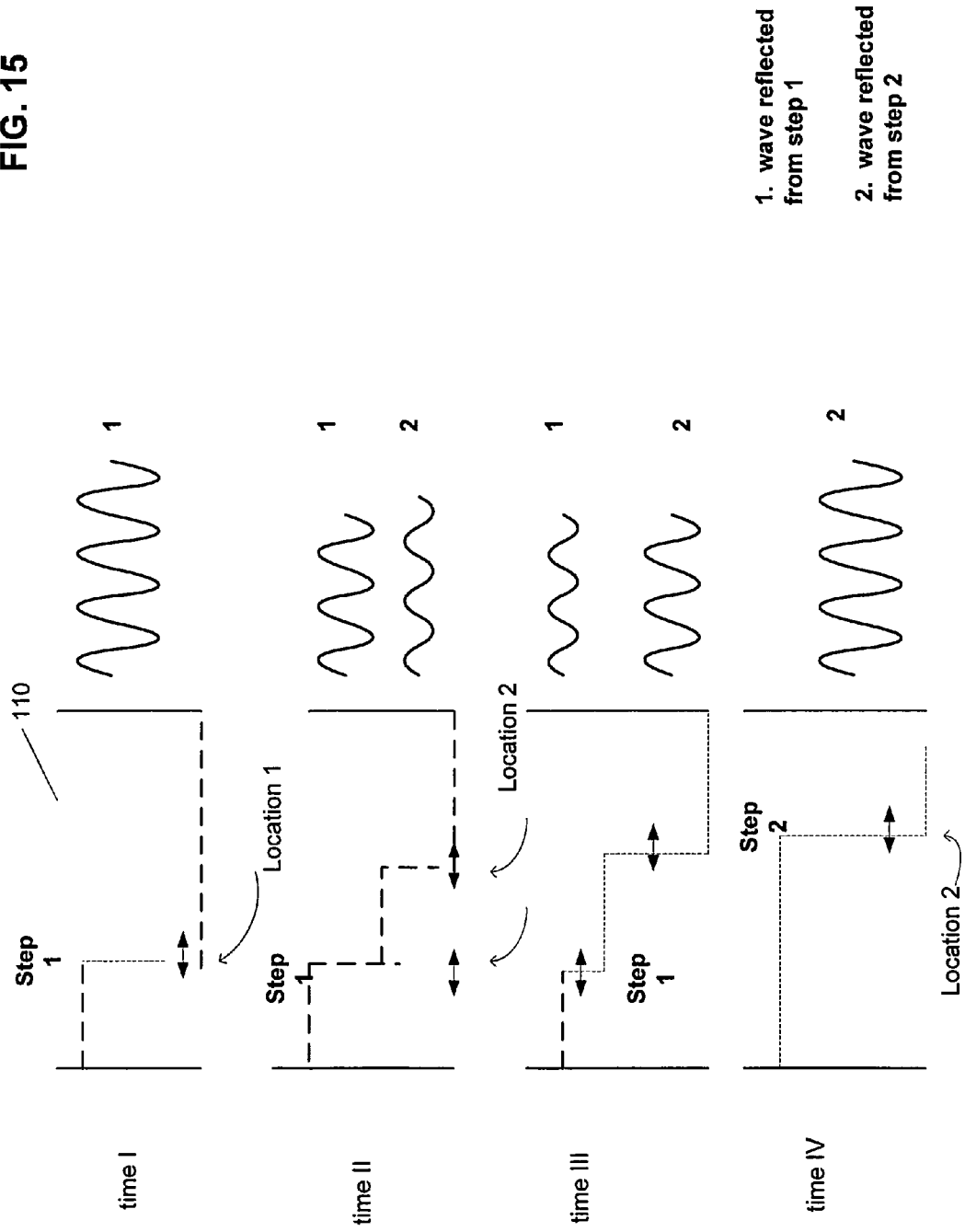

B. Focusing device

Passive transponder

Signal Receiver

Signal transmitter

METAMATERIAL SURFACES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

Related Applications

1. For purposes of the USPTO extra-statutory requirements, the present application is related to U.S. patent application Ser. No. 12/386,522, entitled EVANESCENT ELECTROMAGNETIC WAVE CONVERSION APPARATUS I, naming Jeffrey A. Bowers, Roderick A. Hyde, Edward K. Y. Jung, John Brian Pendry, David Schurig, David R. Smith, Clarence T. Tegreene, Thomas Allan Weaver, Charles Whitmer, Lowell L. Wood, Jr. as inventors, filed Apr. 17, 2009, which is currently co-pending, or is an application of which a currently co-pending application is entitled to the benefit of the filing date.
2. For purposes of the USPTO extra-statutory requirements, the present application is related to U.S. patent application Ser. No. 12/386,523, entitled EVANESCENT ELECTROMAGNETIC WAVE CONVERSION APPARATUS II, naming Jeffrey A. Bowers, Roderick A. Hyde, Edward K. Y. Jung, John Brian Pendry, David Schurig, David R. Smith, Clarence T. Tegreene, Thomas Allan Weaver, Charles Whitmer, Lowell L. Wood, Jr. as inventors, filed Apr. 17, 2009, which is currently co-pending, or is an application of which a currently co-pending application is entitled to the benefit of the filing date.
3. For purposes of the USPTO extra-statutory requirements, the present application is related to U.S. patent application Ser. No. 12/386,521, entitled EVANESCENT ELECTROMAGNETIC WAVE CONVERSION APPARATUS III, naming Jeffrey A. Bowers, Roderick A. Hyde, Edward K. Y. Jung, John Brian Pendry, David Schurig, David R. Smith, Clarence T. Tegreene, Thomas Allan Weaver, Charles Whitmer, Lowell L. Wood, Jr. as inventors, filed Apr. 17, 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

This disclosure relates to apparatus and methods for tailored or engineered responses to electromagnetic waves. The apparatus and methods are based on artificially-structured materials (e.g., metamaterials or broadband metamaterials) or other materials that exhibit exceptional properties not readily observed in nature. The materials may exhibit qualitatively new response functions that are observed in the constituent materials, which may result from the inclusion of artificially fabricated, extrinsic, low dimensional inhomogeneities. The new properties may emerge due to specific interactions with electromagnetic fields or due to external electrical control.

BRIEF DESCRIPTION OF THE FIGURES

In the accompanying drawings:

FIGS. 5 and 6 are schematic diagrams illustrating an exemplary variable phase or time delay made of artificially-structured transmissive elements, in accordance with the principles of the solutions described herein;

FIG. 7 is a schematic diagrams illustrating an exemplary variable phase or time delay made of an artificially structured material having a controllable index of refraction responsive to an applied field (F), in accordance with the principles of the solutions described herein; and FIGS. 8-11 are flow diagrams illustrating exemplary features of methods that modify incident electromagnetic waves, in accordance with the principles of the solutions described herein.

FIGS. 12A-E, 13, 14A and 14B, 15 and 16A-F are schematic diagrams which illustrate exemplary modifications of incident electromagnetic waves by the apparatus of FIGS. 1-7 and/or the methods of FIGS. 8-11, in accordance with the principles of the solutions described herein.

Throughout the figures, unless otherwise stated, the same reference numerals and characters are used to denote like features, elements, components, or portions of the illustrated embodiments.

DETAILED DESCRIPTION

Figure 1:
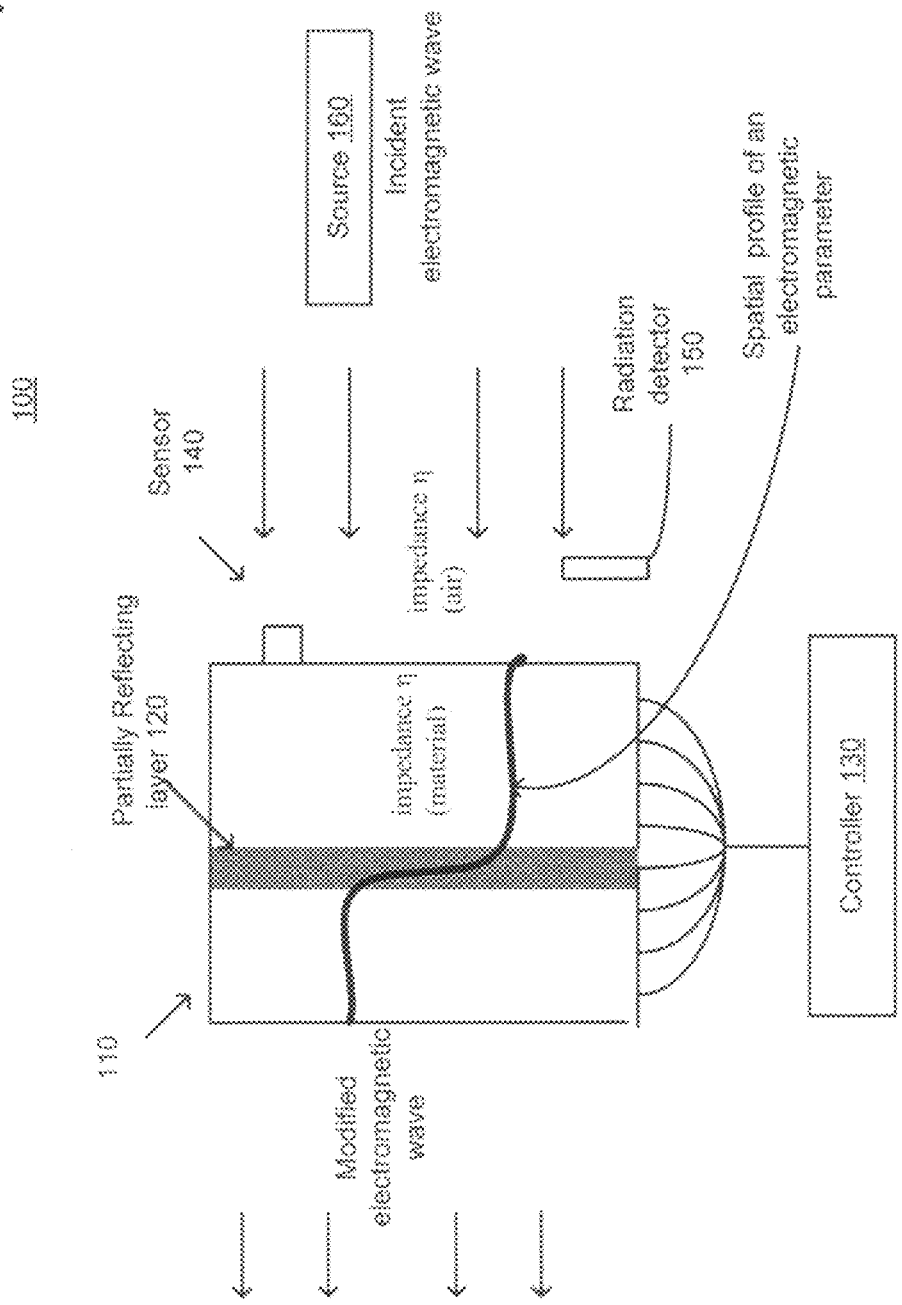
FIGS. 1 and 2 are schematic diagrams illustrating an exemplary apparatus, which is configured to modify an incident free space electromagnetic wave, in accordance with the principles of the solutions described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Some embodiments provide an indefinite medium that is a transformation medium, i.e. an electromagnetic medium having properties that may be characterized according to transformation optics.

Transformation optics is an emerging field of electromagnetic engineering, and transformation optics devices include structures that influence electromagnetic waves, where the influencing imitates the bending of electromagnetic waves in a curved coordinate space (a "transformation" of a flat coordinate space), e.g. as described in A. J. Ward and J. B. Pendry, "Refraction and geometry in Maxwell's equations," J. Mod. Optics 43, 773 (1996), J. B. Pendry and S. A. Ramakrishna, "Focusing light using negative refraction," J. Phys. [Cond. Matt.] 15, 6345 (2003), D. Schurig et al, "Calculation of material properties and ray tracing in transformation media," Optics Express 14, 9794 (2006) ("D. Schurig et al (1)"), and in U. Leonhardt and T. G. Philbin, "General relativity in electrical engineering," New J. Phys. 8, 247 (2006), each of which is herein incorporated by reference. The use of the term "optics" does not imply any limitation with regards to wavelength; a transformation optics device may be operable in wavelength bands that range from radio wavelengths to visible wavelengths and beyond.

A first exemplary transformation optics device is the electromagnetic cloak that was described, simulated, and implemented, respectively, in J. B. Pendry et al, "Controlling electromagnetic waves," Science 312, 1780 (2006); S. A. Cummer et al, "Full-wave simulations of electromagnetic cloaking structures," Phys. Rev. E 74, 036621 (2006); and D. Schurig et al, "Metamaterial electromagnetic cloak at microwave frequencies," Science 314, 977 (2006) ("D. Schurig et al (2)"); each of which is herein incorporated by reference. See also J. Pendry et al, "Electromagnetic cloaking method," U.S. patent application Ser. No. 11/459,728, herein incorporated by reference. For the electromagnetic cloak, the curved coordinate space is a transformation of a flat space that has been punctured and stretched to create a hole (the cloaked region), and this transformation corresponds to a set of constitutive parameters (electricl permittivity and magnetic permeability) for a transformation medium wherein electromagnetic waves are refracted around the hole in imitation of the curved coordinate space.

A second exemplary transformation optics device is illustrated by embodiments of the electromagnetic compression structure described in J. B. Pendry, D. Schurig, and D. R. Smith, "Electromagnetic compression apparatus, methods, and systems," U.S. patent application Ser. No. 11/982,353; and in J. B. Pendry, D. Schurig, and D. R. Smith, "Electromagnetic compression apparatus, methods, and systems," U.S. patent application Ser. No. 12/069,170; each of which is herein incorporated by reference. In embodiments described therein, an electromagnetic compression structure includes a transformation medium with constitutive parameters corresponding to a coordinate transformation that compresses a region of space intermediate first and second spatial locations, the effective spatial compression being applied along an axis joining the first and second spatial locations. The electromagnetic compression structure thereby provides an effective electromagnetic distance between the first and second spatial locations greater than a physical distance between the first and second spatial locations.

A third exemplary transformation optics device is illustrated by embodiments of the electromagnetic cloaking and/or translation structure described in J. T. Kare, "Electromagnetic cloaking apparatus, methods, and systems," U.S. patent application Ser. No. 12/074,247; and in J. T. Kare, "Electromagnetic cloaking apparatus, methods, and systems," U.S. patent application Ser. No. 12/074,248; each of which is herein incorporated by reference. In embodiments described therein, an electromagnetic translation structure includes a transformation medium that provides an apparent location of an electromagnetic transducer different then an actual location of the electromagnetic transducer, where the transformation medium has constitutive parameters corresponding to a coordinate transformation that maps the actual location to the apparent location. Alternatively or additionally, embodiments include an electromagnetic cloaking structure operable to divert electromagnetic radiation around an obstruction in a field of regard of the transducer (and the obstruction can be another transducer).

A fourth exemplary transformation optics device is illustrated by embodiments of the various focusing and/or focus-adjusting structures described in J. A. Bowers et al, "Focusing and sensing apparatus, methods, and systems," U.S. patent application Ser. No. 12/156,443; J. A. Bowers et al, "Emitting and focusing apparatus, methods, and systems," U.S. patent application Ser. No. 12/214,534; J. A. Bowers et al, "Negatively-refractive focusing and sensing apparatus, methods, and systems," U.S. patent application Ser. No. 12/220,705; J. A. Bowers et al, "Emitting and negatively-refractive focusing apparatus, methods, and systems," U.S. patent application Ser. No. 12/220,703; J. A. Bowers et al, "Negatively-refractive focusing and sensing apparatus, methods, and systems," U.S. patent application Ser. No. 12/228,140; and J. A. Bowers et al, "Emitting and negatively-refractive focusing apparatus, methods, and systems," U.S. patent application Ser. No. 12/228,153; each of which is herein incorporated by reference. In embodiments described therein, a focusing and/or focusing-structure includes a transformation medium that provides an extended depth of focus/field greater than a nominal depth of focus/field, or an interior focus/field region with an axial magnification that is substantially greater than or less than one.

Additional exemplary transformation optics devices are described in D. Schurig et al, "Transformation-designed optical elements," Opt. Exp. 15, 14772 (2007); M. Rahm et al, "Optical design of reflectionless complex media by finite embedded coordinate transformations," Phys. Rev. Lett. 100, 063903 (2008); and A. Kildishev and V. Shalaev, "Engineering space for light via transformation optics," Opt. Lett. 33, 43 (2008); each of which is herein incorporated by reference. In general, for a selected coordinate transformation, a transformation medium can be identified wherein electromagnetic fields evolve as in a curved coordinate space corresponding to the selected coordinate transformation. Constitutive parameters of the transformation medium can be obtained from the equations:

$$\tilde{\epsilon}^{i'j'} = [\det(\Lambda)]^{-1} \Lambda_i^{i'} \Lambda_j^{j'} \epsilon^{ij} \quad (1)$$

$$\tilde{\mu}^{i'j'} = [\det(\Lambda)]^{-1} \Lambda_i^{i'} \Lambda_j^{j'} \mu^{ij} \quad (2)$$

where $\tilde{\epsilon}$ and $\tilde{\mu}$ are the permittivity and permeability tensors of the transformation medium, $\epsilon$ and $\mu$ are the permittivity and permeability tensors of the original medium in the untransformed coordinate space, and $$\Lambda_i^{i'} = \frac{\partial x^{i'}}{\partial x^i} \quad (3)$$

is the Jacobian matrix corresponding to the coordinate transformation. In some applications, the coordinate transformation is a one-to-one mapping of locations in the untransformed coordinate space to locations in the transformed coordinate space, and in other applications the coordinate transformation is a one-to-many mapping of locations in the untransformed coordinate space to locations in the transformed coordinate space. Some coordinate transformations, such as one-to-many mappings, may correspond to a transformation medium having a negative index of refraction. In some applications, the transformation medium is an indefinite medium, i.e. an electromagnetic medium having an indefinite permittivity and/or an indefinite permeability (these transformation media may be referred to as "indefinite transformation media"). For example, in equations (1) and (2), if the original permittivity matrix $\in$ is indefinite, then the transformed permittivity matrix $\tilde{\in}$ is also indefinite; and/or if the original permeability matrix $\mu$ is indefinite, then the transformed permeability matrix $\tilde{\mu}$ is also indefinite. In some applications, only selected matrix elements of the permittivity and permeability tensors need satisfy equations (1) and (2), e.g. where the transformation optics response is for a selected polarization only. In other applications, a first set of permittivity and permeability matrix elements satisfy equations (1) and (2) with a first Jacobian $\Lambda$, corresponding to a first transformation optics response for a first polarization of electromagnetic waves, and a second set of permittivity and permeability matrix elements, orthogonal (or otherwise complementary) to the first set of matrix elements, satisfy equations (1) and (2) with a second Jacobian $\Lambda'$, corresponding to a second transformation optics response for a second polarization of electromagnetic waves. In yet other applications, reduced parameters are used that may not satisfy equations (1) and (2), but preserve products of selected elements in (1) and selected elements in (2), thus preserving dispersion relations inside the transformation medium (see, for example, D. Schurig et al (2), supra, and W. Cai et al, "Optical cloaking with metamaterials," Nature Photonics 1, 224 (2007), herein incorporated by reference). Reduced parameters can be used, for example, to substitute a magnetic response for an electric response, or vice versa. While reduced parameters preserve dispersion relations inside the transformation medium (so that the ray or wave trajectories inside the transformation medium are unchanged from those of equations (1) and (2)), they may not preserve impedance characteristics of the transformation medium, so that rays or waves incident upon a boundary or interface of the transformation medium may sustain reflections (whereas in general a transformation medium according to equations (1) and (2) is substantially nonreflective or sustains the reflection characteristics of the original medium in the untransformed coordinate space). The reflective or scattering characteristics of a transformation medium with reduced parameters can be substantially reduced or eliminated (modulo any reflection characteristics of the original medium in the untransformed coordinate space) by a suitable choice of coordinate transformation, e.g. by selecting a coordinate transformation for which the corresponding Jacobian $\Lambda$ (or a subset of elements thereof) is continuous or substantially continuous at a boundary or interface of the transformation medium (see, for example, W. Cai et al, "Nonmagnetic cloak with minimized scattering," Appl. Phys. Lett. 91, 111105 (2007), herein incorporated by reference).

Embodiments of an indefinite medium and/or a transformation medium (including embodiments of indefinite transformation media) can be realized using the artificially-structured materials. Generally speaking, the electromagnetic properties of the artificially-structured materials derive from their structural configurations, rather than or in addition to their material composition.

In some embodiments, the artificially-structured materials are photonic crystals. Some exemplary photonic crystals are described in J. D. Joannopoulos et al, *Photonic Crystals Molding the Flow of Light*, $2^{nd}$ Edition, Princeton Univ. Press, 2008, which is incorporated by reference herein. In a photonic crystals, photonic dispersion relations and/or photonic band gaps are engineered by imposing a spatially-varying pattern on an electromagnetic material (e.g. a conducting, magnetic, or dielectric material) or a combination of electromagnetic materials. The photonic dispersion relations translate to effective constitutive parameters (e.g. permittivity, permeability, index of refraction) for the photonic crystal. The spatially-varying pattern is typically periodic, quasi-periodic, or colloidal periodic, with a length scale comparable to an operating wavelength of the photonic crystal.

In other embodiments, the artificially-structured materials are metamaterials. Some exemplary metamaterials are described in R. A. Hyde et al, "Variable metamaterial apparatus," U.S. patent application Ser. No. 11/355,493; D. Smith et al, "Metamaterials," International Application No. PCT/US2005/026052; D. Smith et al, "Metamaterials and negative refractive index," Science 305, 788 (2004); D. Smith et al, "Indefinite materials," U.S. patent application Ser. No. 10/525,191; C. Caloz and T. Itoh, *Electromagnetic Metamaterials: Transmission Line Theory and Microwave Applications*, Wiley-Interscience, 2006; N. Engheta and R. W. Ziolkowski, eds., *Metamaterials: Physics and Engineering Explorations*, Wiley-Interscience, 2006; and A. K. Sarychev and V. M. Shalaev, *Electrodynamics of Metamaterials*, World Scientific, 2007; each of which is herein incorporated by reference.

Metamaterials generally feature subwavelength elements, i.e. structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination theieof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41(2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffivan, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, or other variations along some continuous structure (e.g. etchings on a substrate). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

In some embodiments a metamaterial may include a layered structure. For example, embodiments may provide a structure having a succession of adjacent layers, where the layers have a corresponding succession of material properties that include electromagnetic properties (such as permittivity and/or permeability). The succession of adjacent layers may be an alternating or repeating succession of adjacent layers, e.g. a stack of layers of a first type interleaved with layers of a second type, or a stack that repeats a sequence of three or more types of layers. When the layers are sufficiently thin (e.g. having thicknesses smaller than an operating wavelength of the metamaterial), the layered structure may be characterized as an effective continuous medium having effective constitutive parameters that relate to the electromagnetic properties of the individual layers. For example, consider a planar stack of layers of a first material (of thickness $d_1$, and having homogeneous and isotropic electromagnetic parameters $\epsilon_1$, $\mu_1$) interleaved with layers of a second material (of thickness $d_2$, and having homogeneous and isotropic electromagnetic parameters $\epsilon_2$, $\mu_2$); then the layered structure may be characterized as an effective continuous medium having (effective) anisotropic constitutive parameters $$\varepsilon_x = \varepsilon_y = \frac{\varepsilon_1 + \eta \varepsilon_2}{1 + \eta}, \tag{4}$$

$$\frac{1}{\varepsilon_z} = \frac{1}{1+\eta}\left(\frac{1}{\varepsilon_1} + \frac{\eta}{\varepsilon_2}\right), \tag{5}$$

$$\mu_x = \mu_y = \frac{\mu_1 + \eta \mu_2}{1 + \eta}, \tag{6}$$

$$\frac{1}{\mu_z} = \frac{1}{1+\eta}\left(\frac{1}{\mu_1} + \frac{\eta}{\mu_2}\right) \tag{7}$$

where $\eta = d_2/d_1$ is the ratio of the two layer thicknesses, z is the direction normal to the layers, and x, y are the directions parallel to the layers. When the two materials comprising the interleaved structure have electromagnetic parameters that are oppositely-signed, the constitutive parameters (4)-(7) may correspond to an indefinite medium. For example, when the first material is a material having a permittivity $\epsilon_1 < 0$ and the second material is a material having a permittivity $\epsilon_2 > 0$, the ratio $\eta$ may be selected to provide an indefinite permittivity matrix according to equations (4)-(5) (moreover, for $\eta$ substantially equal to $|\epsilon_1/\epsilon_2|$, the indefinite permittivity medium is substantially a degenerate indefinite permittivity medium). Alternately or additionally, when the first material is a material having a permeability $\mu_1 < 0$ and the second material is a material having a permeability $\mu_2 > 0$, the ratio $\eta$ may be selected to provide an indefinite permeability matrix according to equations (6)-(7) (moreover, for $\eta$ substantially equal to $|\mu_1/\mu_2|$, the indefinite permeability medium is substantially a degenerate indefinite permeability medium).

Exemplary planar stacks of alternating materials, providing an effective continuous medium having an indefinite permittivity matrix, include an alternating silver/silica layered system described in B. Wood et al, "Directed subwavelength imaging using a layered medal-dielectric system," Phys. Rev. B 74, 115116 (2006), and an alternating doped/undoped semiconductor layered system described in A. J. Hoffman, "Negative refraction in semiconductor metamaterials," Nature Materials 6, 946 (2007), each of which is herein incorporated by reference. More generally, materials having a positive permittivity include but are not limited to: semiconductors (e.g. at frequencies higher than a plasma frequency of the semiconductor) and insulators such as dielectric crystals (e.g. silicon oxide, aluminum oxide, calcium fluoride, magnesium fluoride), glasses, ceramics, and polymers (e.g. photoresist, PMMA). Generally these materials have a positive permeability as well (which may be substantially equal to unity if the material is substantially nonmagnetic). In some embodiments a positive permittivity material is a gain medium, which may be pumped, for example, to reduce or overcome other losses such as ohmic losses (cf. an exemplary alternating silver/gain layered system described in S. Ramakrishna and J. B. Pendry, "Removal of absorption and increase in resolution in a near-field lens via optical gain," Phys. Rev. B 67, 201101(R) (2003), herein incorporated by reference). Examples of gain media include semiconductor laser materials (e.g. GaN, AlGaAs), doped insulator laser materials (e.g. rare-earth doped crystals, glasses, or ceramics), and Raman gain materials. Materials having a negative permeability include but are not limited to: ferrites, magnetic garnets or spinels, artificial ferrites, and other ferromagnetic or ferrimagnetic materials (e.g. at frequencies above a ferromagnetic or ferrimagnetic resonance frequency of the material; cf. F. J. Rachford, "Tunable negative refractive index composite," U.S. patent application Ser. No. 11/279/460, herein incorporated by reference). Materials having a negative permittivity include but are not limited to: metals (e.g. at frequencies less than a plasma frequency of the metal) including the noble metals (Cu, Au, Ag); semiconductors (e.g. at frequencies less than a plasma frequency of the semiconductor); and polar crystals (e.g. SiC, LiTaO$_3$, LiF, ZnSe) at frequencies within a restrahlen band of the polar crystal (cf. G. Schvets, "Photonic approach to making a material with a negative index of refraction," Phys. Rev. B 67, 035109 (2003) and T. Tauber et al, "Near-field microscopy through a SiC superlens," Science 313, 1595 (2006), each of which is herein incorporated by reference). For applications involving semiconductors, the plasma frequency (which may be regarded as a frequency at which the semiconductor permittivity changes sigh) is related to the density of free carriers within the semiconductor, and this free carrier density may be controlled in various ways (e.g. by chemical doping, photodoping, temperature change, carrier injection, etc.). Thus, for example, a layered system comprising interleaved layers of a first semiconductor material having a first plasma frequency and a second semiconductor material having a second plasma frequency may provide an indefinite permittivity (per equations (4)-(5)) in a window of frequencies intermediate the first plasma frequency and the second plasma frequency, and this window may be controlled, e.g., by differently doping the first and second semiconductor materials.

In some applications a layered structure includes a succession of adjacent layers that are substantially nonplanar. The preceding exemplary layered structure—consisting of successive planar layers, each layer having a layer normal direction (the z direction) that is constant along the transverse extent of the layer and a layer thickness that is constant along the transverse extent of the layer—may be extended to a nonplanar layered structure, consisting of successive nonplanar layers, each layer having a layer normal direction that is non-constant along the transverse extent of the layer and, optionally, a layer thickness that is non-constant along the transverse extent of the layer. Some examples of cylindrical and/or spherical layered structures are described in A. Salandrino and N. Engheta, "Far-field subdiffraction optical microscopy using metamaterial crystals: Theory and simulations," Phys. Rev. B 74, 075103 (2006); Z. Jacob et al, "Optical hyperlens: Far-field imaging beyond the diffraction limit," Opt. Exp. 14, 8247 (2006); Z. Liu et al, "Far field optical hyperlens magnifying sub-diffraction-limited objects," Science 315, 1686 (2007); and H. Lee, "Development of optical hyperlens for imaging below the diffraction limit," Opt. Exp. 15, 15886 (2007); each of which is herein incorporated by reference. More generally, for an alternating nonplanar layered structure, supposing that the layers have curvature radii substantially less than their respective thicknesses, and transverse layer thickness gradients substantially less than one, the nonplanar layered structure may be characterized as an effective continuous medium having (effective) anisotropic constitutive parameters as in equations (4)-(7), where the z direction is replaced by a layer normal direction that may vary with position within the layered structure, the x direction is replaced by a first transverse direction perpendicular to the layer normal direction, the y direction is replaced by a second transverse direction mutually perpendicular to the layer normal direction and the first transverse direction, and the layer thickness ratio $\eta=d_2/d_1$ is a ratio of local layer thicknesses $d_1$ and $d_2$ that may vary with position throughout the layered structure (so the ratio $\eta$ may vary with position as well). The nonplanar layered structure may thus provide an indefinite medium having a spatially-varying axial direction that corresponds to the layer normal direction. Suppose, for example, that the spatially-varying axial direction of an indefinite medium is given by a vector field $u_A(r)$ that is equal to or parallel to a conservative vector field, i.e.

$$u_A \propto \nabla \Phi \quad (8)$$

for a scalar potential function $\Phi$; then the indefinite medium may be provided by a nonplanar layered structure where the interfaces of adjacent layers correspond to equipotential surfaces of the function $\Phi$.

With impedance-matching, a wave impedance of the output surface region is substantially equal to a wave impedance of the adjacent medium. The wave impedance of an isotropic medium is $$Z_0 = \sqrt{\frac{\mu}{\varepsilon}} \quad (9)$$

while the wave impedance of a generally anisotropic medium is a tensor quantity, e.g. as defined in L. M. Barkovskii and G. N. Borzdov, "The impedance tensor for electromagnetic waves in anisotropic media," J. Appl. Spect. 20, 836 (1974) (herein incorporated by reference). In some embodiments an impedance-matching is a substantial matching of every matrix element of the wave impedance tensor (i.e. to provide a substantially nonreflective interface for all incident polarizations); in other embodiments an impedance-matching is a substantial matching of only selected matrix elements of the wave impedance tensor (e.g. to provide a substantially non-reflective interface for a selected polarization only). In some embodiments, the adjacent medium defines a permittivity $\varepsilon_1$ and a permeability $\mu_1$, where either or both parameters may be substantially unity or substantially non-unity; the output surface region defines a permittivity $\varepsilon_2$ and a permeability $\mu_2$, where either or both parameters may be substantially unity or substantially non-unity; and the impedance-matching condition implies $$\frac{\varepsilon_2}{\varepsilon_1} \cong \frac{\mu_2}{\mu_1} \quad (10)$$

where $\varepsilon_2$ and $\mu_2$ may be tensor quantities. Defining a surface normal direction and a surface parallel direction, some embodiments provide a output surface region that defines: a surface normal permittivity $\in_2^\perp$ corresponding to the surface normal direction and a surface parallel permittivity $\in_2^\Box$ corresponding to the surface parallel direction; and/or a surface normal permeability $\in_2^\perp$ corresponding to the surface normal direction and a surface parallel permeability $\mu_2^\Box$ corresponding to the surface parallel direction; and the impedance-matching condition may imply one or both of the following conditions:

$$\frac{\varepsilon_2^\perp}{\varepsilon_1} \cong \frac{\varepsilon_1}{\varepsilon_2^\Box}, \frac{\mu_2^\perp}{\mu_1} \cong \frac{\mu_1}{\mu_2^\Box}. \quad (11)$$

Where the output surface region is a curved surface region, the surface normal direction and the surface parallel direction can vary with position along the input surface region.

Nonplanar layered structures may be fabricated by various methods that are known to those of skill in the art. In a first example, J. A. Folta, "Dynamic mask for producing uniform or graded-thickness thin films," U.S. Pat. No. 7,062,348 (herein incorporated by reference), describes vapor deposition systems that utilize a moving mask, where the velocity and position of the moving mask may be computer controlled to precisely tailor the thickness distributions of deposited films. In a second example, Tzu-Yu Wang, "Graded thickness optical element and method of manufacture therefor," U.S. Pat. No. 6,606,199 (herein incorporated by reference), describes methods for depositing graded thickness layers through apertures in a masking layer.

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

The term "metamaterials" as used herein may be understood to include "electromagnetic crystals" (e.g., photonic crystals, electromagnetic band gap structures (EBG), and/or photonic bandgap structures (PBG)). Electromagnetic crystals are periodic structures composed of dielectric or metallic regular lattices with a given unit cell. The periodic structures function is to affect the propagation of electromagnetic waves. A periodic structures (e.g., a dielectric or metallo-dielectric nanostructure) may affect the propagation of electromagnetic waves in the same way as the periodic potential in a semiconductor crystal affects the electron motion by defining allowed and forbidden electronic energy bands. Photons (behaving as waves) propagate through this structure—or not—depending on their wavelength. Wavelengths of light that are allowed to travel are known as modes, and groups of allowed modes form bands. Disallowed bands of wavelengths are called photonic band gaps. See e.g., J. D. Joannopoulos et al, *Photonic Crystals: Molding the Flow of Light*, $2^{nd}$ Edition, Princeton Univ. Press, 2008.

FIG. 1 shows an exemplary apparatus 100 which is configured to modify an incident free space electromagnetic wave. Apparatus 100 includes a material (e.g., material block 110 made of artificially structured material) configured to intercept and modify an incident free space electromagnetic wave. The material may have an adjustable spatial distribution of electromagnetic properties or parameters (e.g., dielectric constant $\in$, permeability $\mu$, impedance $\eta$, conductivity $\sigma$, refractive index n, etc.). The electromagnetic properties or parameters of the material may have selected values that define particular changes or modifications made to the incident electromagnetic wave by the material. For example, FIG. 1 shows a spatial distribution of an electromagnetic parameter (e.g., refractive index n) which has a step-like feature 120 that may act to partially reflect the incident electromagnetic wave.

The material may for example, include one or more of a photonic bandgap material, a metamaterial, a broadband metamaterial. Further, the material may, for example, be transmissive material having a variable refractive index. Alternatively or additionally, the material may, for example, include at least one layer switchable between a transmissive state and a reflective state. The transmissive and/or reflective states may be only partially so. The material may be switchable states in response to an applied control signal (e.g., an electric field, an electric current, a magnetic field, an ultrasonic signal, mechanical stress or strain, an electromagnetic signal, and/or a light wave). For example, the material may, be an optically-switched metamaterial, and the control signal an optical signal of having a defined wavelength and/or intensity.

Material block 110 may include an arrangement of discrete elements, which provide the adjustable spatial distribution of electromagnetic parameters. The discrete elements may, for example, include one or more man-made metamaterial elements (e.g., resonant structures).

Material block 110 may present varying amounts of optical path length or delay to incident electromagnetic waves. The amount or quantity of the optical path length may be a function of the spatial distribution of electromagnetic parameters in block 110. FIG. 12A shows optical path lengths Λ of transmitted electromagnetic waves in transmissive material block 110 for various exemplary refractive index profiles. In particular, FIG. 12A shows three exemplary cases (Cases I-III) of refractive indices profiles in the material block having an overall thickness L. Cases I-III correspond to bi-layer refractive index profiles having a refractive index value $(n_i)$ over each layer thickness $(s_i)$. In Case I, material block 110 has the same refractive index (n1) throughout its thickness L. Thus, a step difference in the refractive index at location 120 is trivially zero. The optical path length Λ of an electromagnetic wave transmitted through material block 110 is proportional to L*n1. In Case II, material block 110 has a refractive index n2 over a distance $s_2$=a and a refractive index n1 over a distance $s_1$=b. Thus, a step difference in the refractive index at location 120 is (n2−n1). The optical path length Λ of a transmitted electromagnetic wave in material block 110 is equal to a*(n2−n1)+L*n1. In Case III, material block 110 has a refractive index (−n1) over a distance $s_2$=a and a refractive index n1 over a distance $s_1$=b with a resulting optical path length Λ equal to (b−a)*n1. When distance a=distance b, then the optical path length Λ reduces to zero. When distance a is greater than distance b, then the optical path length Λ is negative.

Thus, material block 110, which has a controllable refractive index profile, may operate as a variable path delay element. The material may be controlled (e.g., according to rules of transformation optics) so that the material presents a propagation distance (e.g., optical path length Λ) that may be larger than or less than the physical dimension of material block 110 (e.g., thickness L).

Figure 12B:
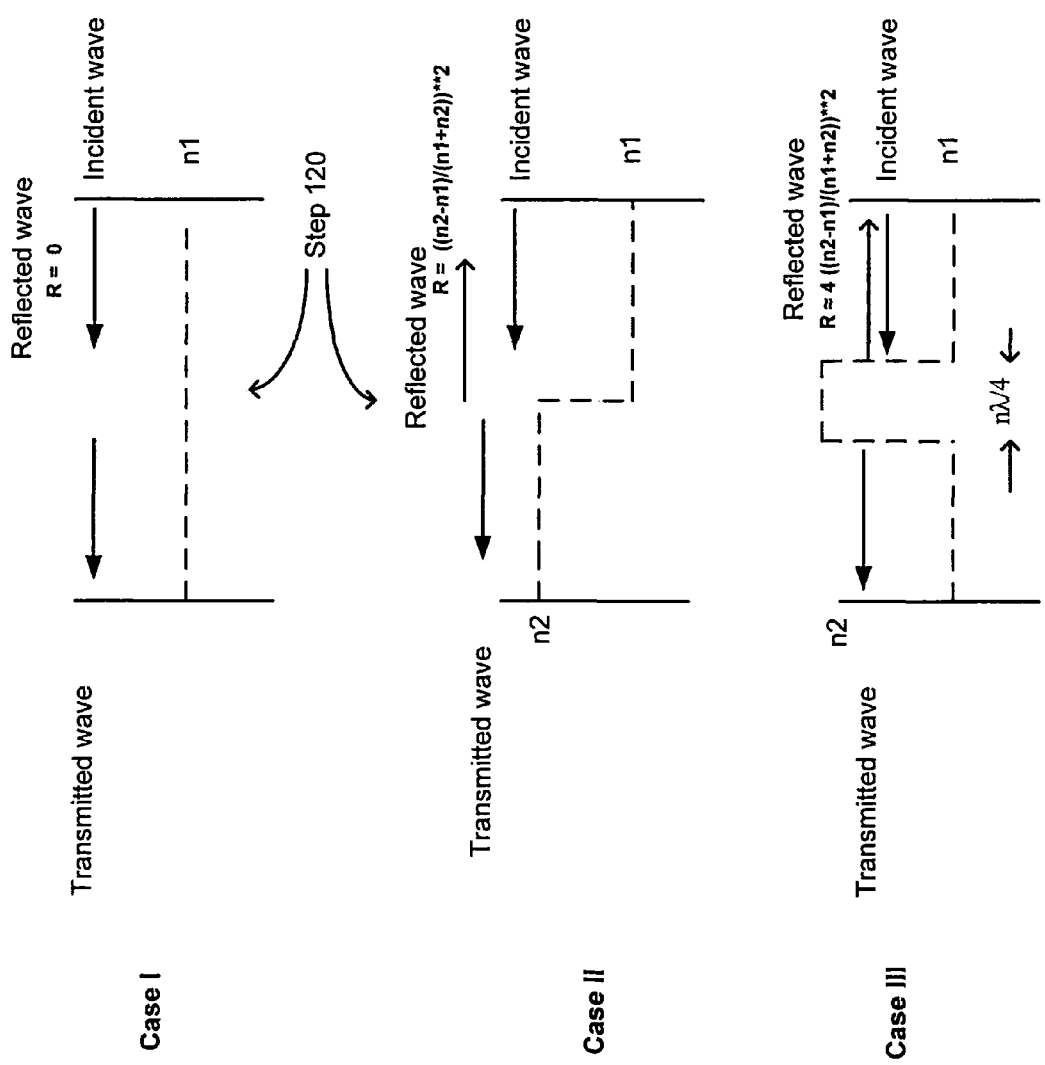

Material block 110 with an adjustable spatial distribution of electromagnetic parameters operating as a transmissive variable path delay element may have one or more states that are at least partially reflective. FIG. 12B shows, for example, a variable delay element with three states (e.g., Cases I-III) corresponding to different refractive index profiles. The figure shows changes in the intensity of an electromagnetic wave reflected by a step (e.g., step 120) in the refractive index profile of block 110. Case 1 in which a refractive index step at location 120 is nominally zero corresponds to a transmissive state with no reflection (R=0). Case 2 having a finite refractive index step (n2−n1) at location 120 corresponds to, a partially reflective state with a reflection coefficient R=((n2−n1)/(n1+n2))2. Case 3 having a multilayered refractive index profile (e.g., a step up-step down profile) corresponds to a partially reflective state in which constructive or destructive interference of the reflected waves from the up and down steps in the profile may lead to a reflection coefficient R, which is larger or smaller than the reflection coefficient R in Case 2**.

Figure 12C:
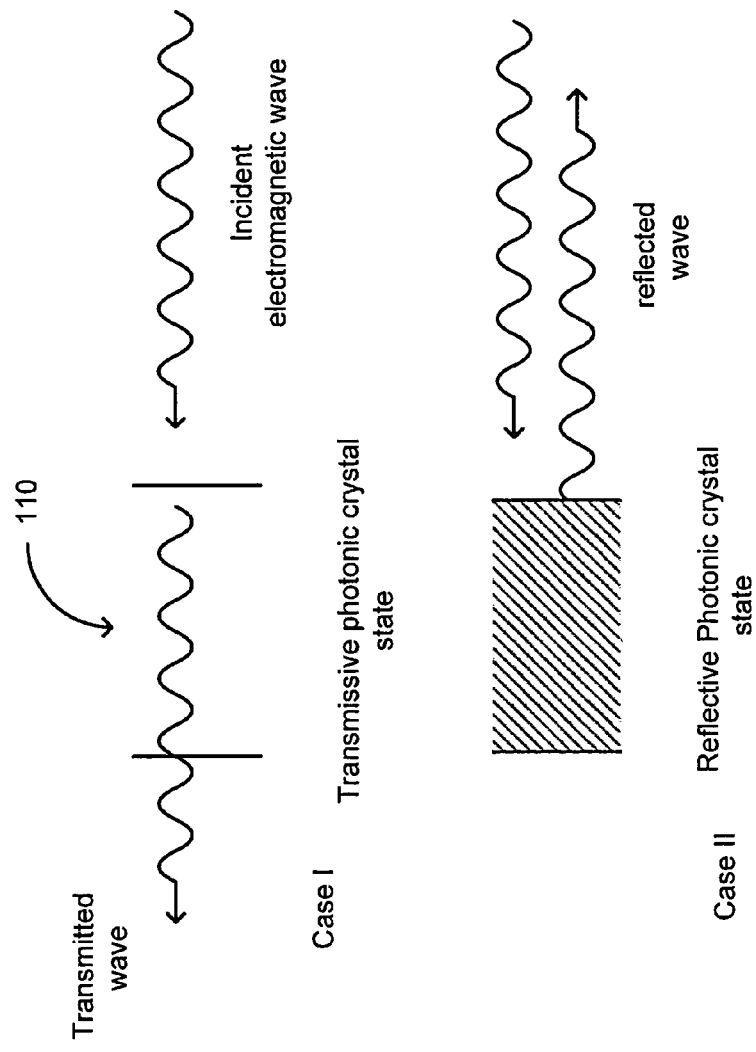

Further, material block 110 with an adjustable spatial distribution of electromagnetic parameters operating as a variable path delay elements may have one or more states that are at fully reflective (e.g., by substantially completely blocking transmission). FIG. 12C shows, for example, a block 110 made of photon crystal material. An incident electromagnetic wave may be transmitted or fully reflected by block 110 depending on whether the photonic crystal is in a transmissive or reflective state, respectively.

Figure 12D:
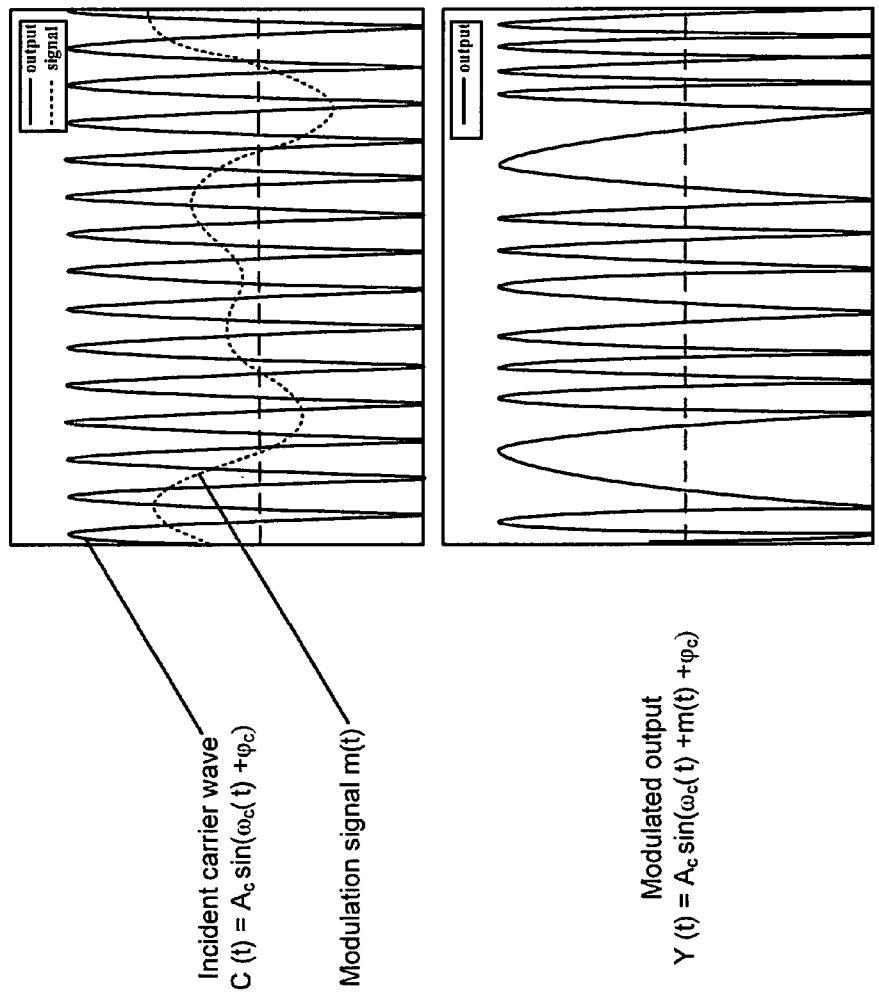
Figure 12E:
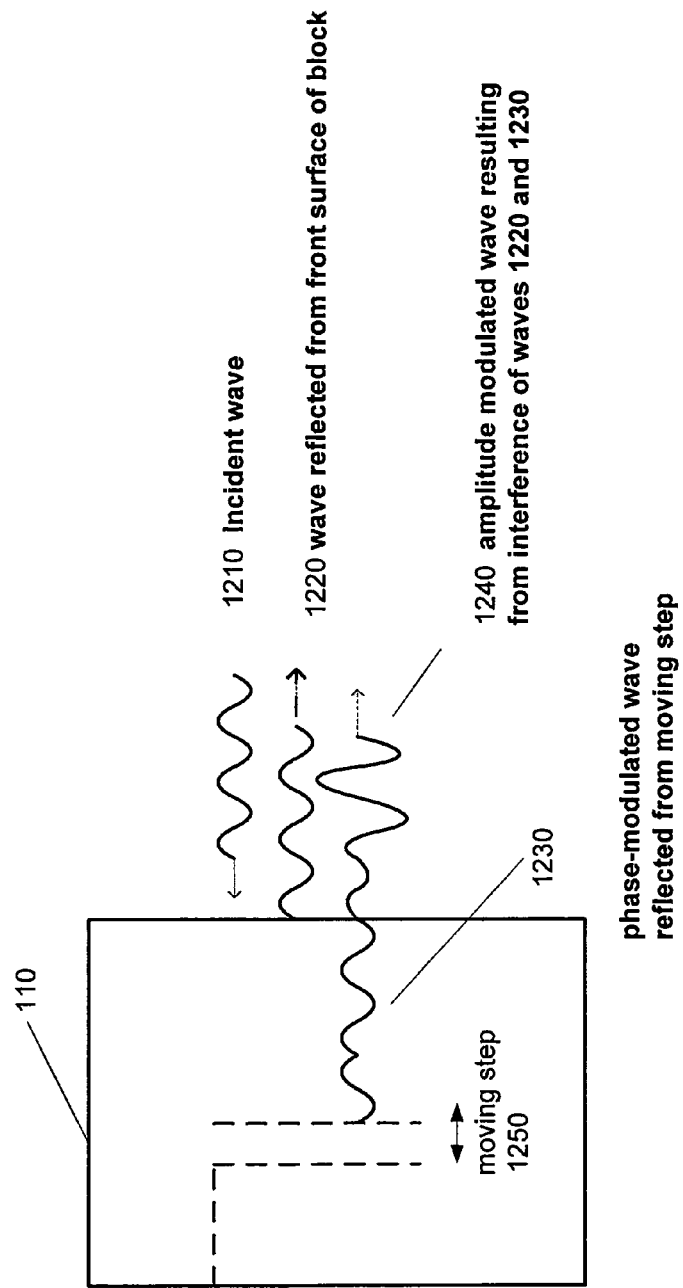

Changing the optical path length traversed by an electromagnetic effectively phase modulates the electromagnetic wave. Dynamically varying the spatial distribution of electromagnetic parameters in material block 110 in may allow time-dependent phase shifts to be introduced in the electromagnetic waves. FIG. 12D shows an example of a time-dependent phase modulation of a carrier electromagnetic wave according to a modulation function m(t). The phase modulation achieved may be suitably converted into amplitude modulation. FIG. 12E shows, for example, an incident electromagnetic wave 1210 incident on a surface of material block 110 in which the position of a step 1250 in the spatial profile of at least one electromagnetic parameter is dynamically changed. At least a portion of the incident wave may be reflected by the surface (e.g., reflected wave 1220). The movement of step 1250 may generate a phase modulated reflected wave 1230. Superposition of this phase modulated wave 1230 with reflected wave 1220 may result in an amplitude modulated wave 1240.

With renewed reference to FIG. 1, apparatus 100 further includes a controller 130, which may be configured to dynamically adjust the position, size and/or shape of the spatial distribution of electromagnetic parameters in the material, for example, by applying suitable control signals to the material. The control signals may dynamically adjust the properties or operation of the discreet/metamaterial elements in the material to obtain a selected spatial distribution of the electromagnetic parameters. Thus, the electromagnetic parameters in the material may be a function of both position and time (e.g., $\in$(x, y, z, t), μ(x, y, z, t), η(x, y, z, t), σ(x, y, z, t), n(x, y, z, t), etc.). Controller 130 may modify the electromagnetic parameters in the material according to a modulation signal or function (e.g., m (t)).

Apparatus 100 may also include a sensor circuit (e.g., sensor 140) to sense properties of the incident electromagnetic wave (e.g. frequency, rate of change of frequency, bandwidth etc.) and to relay such information to controller 130.

Controller 130 may, for example, be configured to adjust the spatial distribution (e.g., by changing the position of step-like feature 120) to introduce a time-varying path delay d (t) in the modified electromagnetic wave relative to the incident electromagnetic wave. The introduced time-varying path delay d (t) may, for example, a substantially pseudo-random or random function of time, or a substantially periodic function of time. The time-varying path delay d(t) may be a substantially continuous function of time over a time interval substantially larger than a cycle (1/f) of the incident electromagnetic wave. The function may have first or second order discontinuities, which may define the intervening time interval over which it is continuous. Exemplary time-varying path delay d (t) functions are linear (e.g., d(t)≈αt+$β_0$) or quadratic (e.g., d(t)≈α$t^2$+βt+$γ_0$) in time. A linearly varying path delay may result in a modified electromagnetic wave that is shifted in frequency by a fixed amount from the incident wave. A quadratically varying path delay may likewise result in a modified electromagnetic wave that is shifted in frequency from the incident wave, but by an amount that is time varying. (See e.g., FIG. 13).

Figure 13:
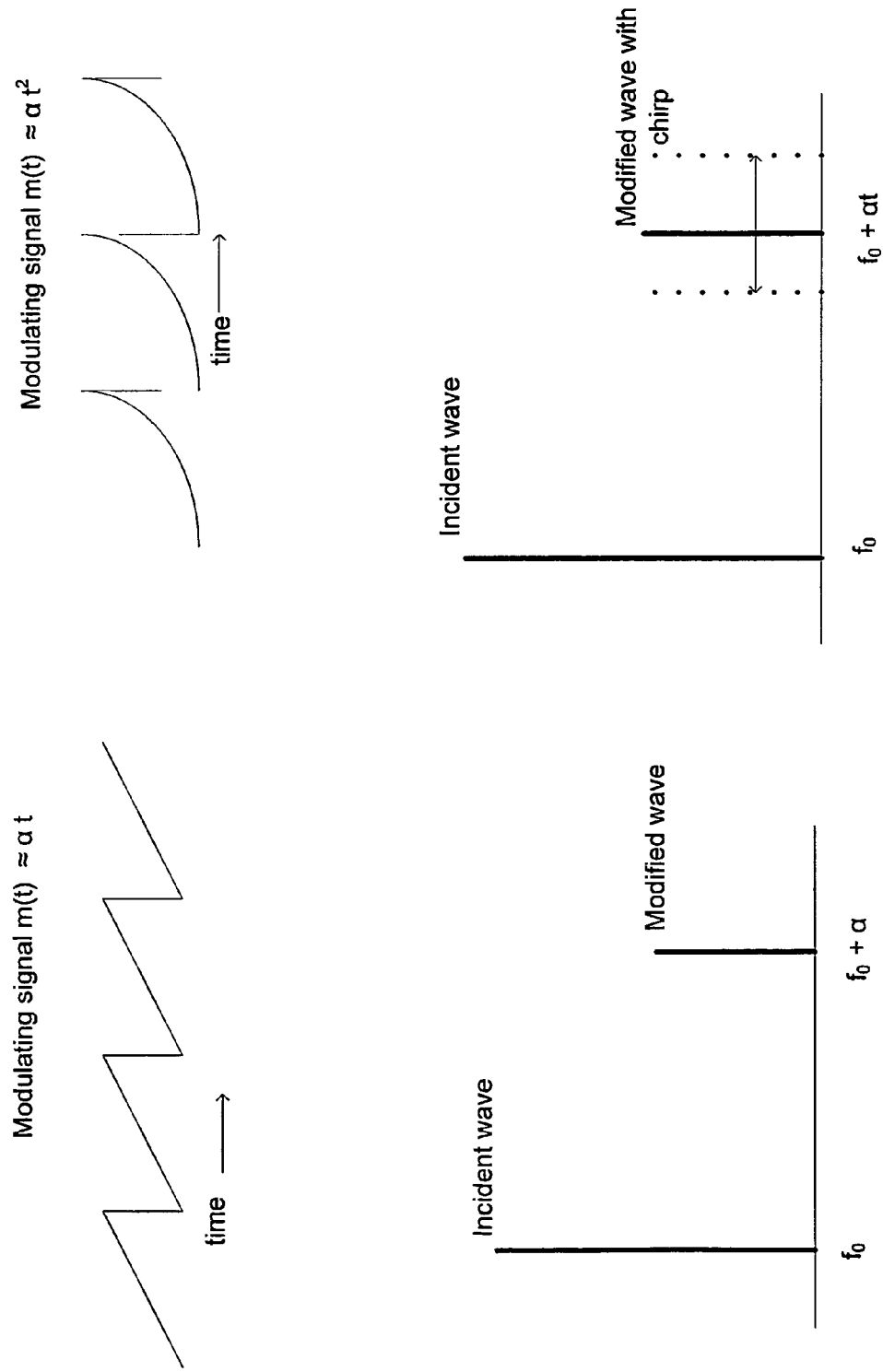

FIG. 13 shows, for example, a triangle wave or linear sawtooth-shaped modulation signal m(t), which is a first order discontinuous function. Changing the path delay of an electromagnetic wave (frequency $f_0$) according to this modulation function m(t) may result in a modified electromagnetic wave that is shifted in frequency by a fixed amount (≈α) from the incident wave. In this case, there may be little or minimal energy shift to other frequencies (i.e. other than $f_0$+α). FIG. 13 also shows, for example, a quadratic sawtooth-shaped modulation signal m(t), which is second order discontinuous (i.e. with abrupt changes in slope). Changing the path delay of an electromagnetic wave (frequency $f_0$) according to this modulation function m(t) may result in a modified electromagnetic wave that is shifted in frequency by a linearly varying amount or chirp (e.g., ≈αt) from the incident wave. In both the cases shown in FIG. 13, the frequency shift is proportional to the incident frequency (i.e., a Doppler-like frequency shift) and to the component of the path delay change parallel to the propagation direction.

With renewed reference to FIG. 1 and the operation of controller 130, the time-varying phase shift φ(t) may be a selected function such that material block 110 has an apparent velocity (≈dφ(t)/dt) and/or an apparent acceleration (≈$d^2$φ(t)/$d^2$t) that are different than its actual velocity and/or acceleration, respectively. In the case of a linearly varying path delay d (t) (e.g., d(t)≈αt+$β_0$), a frequency f' of the modified electromagnetic wave may be shifted relative to a frequency f of the incident electromagnetic wave by an amount of δf(≈α/2π).

Controller 130 may be configured to dynamically vary an effective position of the selected spatial profile to time-modulate a property of the modified electromagnetic wave. The change in the effective position of the selected spatial profile may include one or more of a translation, a rotation, a tilt, a curvature change, a size and/or shape change of the selected spatial profile.

Figure 2:
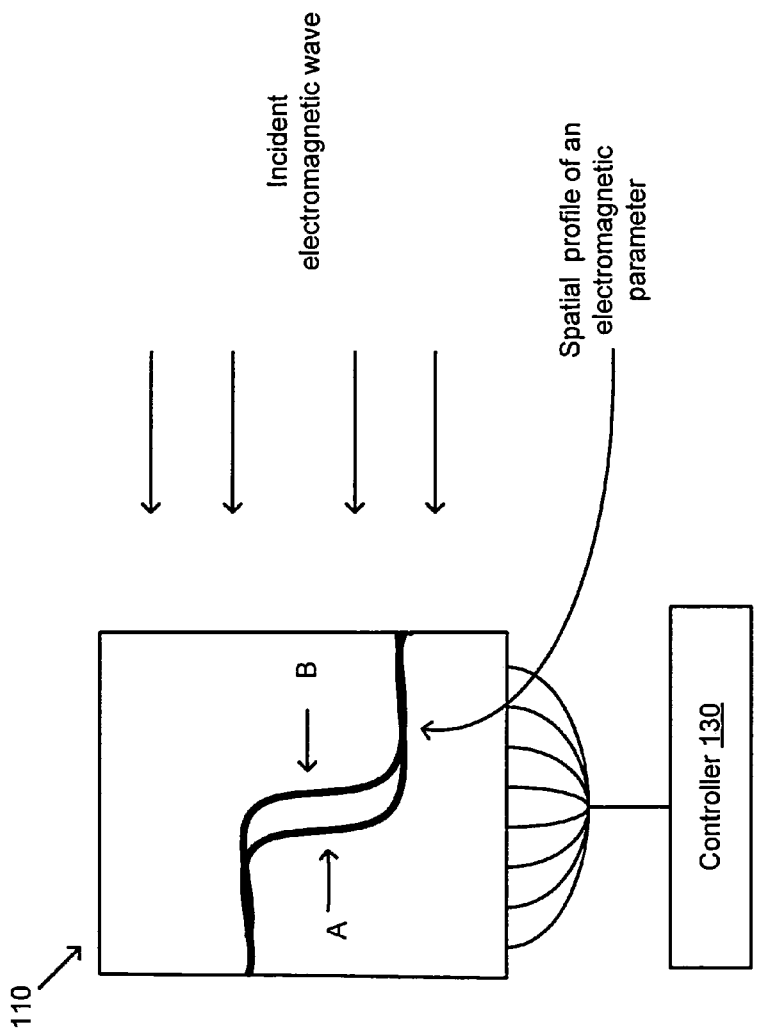

In an exemplary implementation of apparatus 100, controller 130 may be configured to dynamically change an effective position of the selected spatial profile to time-modulate a phase of the modified electromagnetic wave, for example, in response to an external signal. In such an implementation, apparatus 100 may operate or act as a variable optical element or delay. Controller 130 may be configured to dynamically vary the effective position continuously in space. For example, step-like feature 120 may be varied substantially continuously in space between end positions A and B (FIG. 2) in a substantially cyclical or oscillatory fashion.

The extent or range of the variation in the effective position may be selected with consideration of the characteristics of the incident and/or modified electromagnetic waves. For example, controller 130 may be configured to vary the effective position of the selected spatial profile over a distance that is a fraction of, comparable to, or larger than a wavelength of the incident electromagnetic wave in the material. For example, controller 130 may be configured to vary the effective position of the selected spatial profile in distance increments smaller than about 0.03 of a wavelength of the incident electromagnetic wave in the material so that a reflected wavefront changes smoothly. These distance increments may equivalently correspond to controlling the phase of the modified electromagnetic wave with an accuracy substantially better than about $0.06*\pi$ radians.

In alternative implementations or operations of apparatus 100, controller 130 may be configured to vary the effective position of the selected spatial profile in distance increments equal to or larger than 0.03 of a wavelength of the incident electromagnetic wave in the material. These distance increments may equivalently correspond to controlling the phase of the modified electromagnetic wave with an accuracy of about $0.06*\pi$ radians. In other implementations or operations of apparatus 100, controller 130 may be configured to vary the effective position of the selected spatial profile in distance increments equal to or larger than about 0.25 of a wavelength of the incident electromagnetic wave in the material. These distance increments may equivalently correspond to controlling the phase of the modified electromagnetic wave with an accuracy of about an accuracy of about $0.5*\pi$ radians.

FIGS. 14A and 14B show exemplary representations of the "frequency shifting" phenomena that may be obtained with moving objects. FIG. 14A show a vehicle moving relative to a conventional Doppler radar arrangement with a relative velocity $V_{rel}$. The radar emits an electromagnetic wave having a frequency $f_0$ toward the moving vehicle. The movement of the vehicle results in detection by the Doppler radar of a reflected wave, whose frequency is "Doppler" shifted by an amount $\Delta f \approx 2V_{rel}*f_0/c$. FIG. 14B shows a similar Doppler shifting effect caused by an oscillating mirror, which reflects an electromagnetic wave incident by the Doppler radar. The shift in frequency in this case may be $\Delta f \approx \pm 2V_{effective}*f_0/c$, where $V_{effective}$ is the velocity of the oscillating mirror with respect to the Doppler radar.

With renewed reference to FIG. 1, controller 130 may be configured to dynamically change the effective position of the selected spatial profile at a rate substantially different that an actual velocity v of the material. In exemplary implementations of apparatus 100, controller 130 may be configured to change the effective position of the selected spatial profile cyclically with a cycle frequency about equal to or greater than a modulation frequency of the incident electromagnetic wave.

In other exemplary implementations of apparatus 100, the effective position of the selected spatial profile may be changed such that a portion of the energy of the modified electromagnetic wave has a frequency translated outside a pre-defined frequency band of a receiver of the modified electromagnetic wave. (See e.g., FIG. 14B). Controller 130 may vary the effective position of the selected spatial profile so that a portion of the energy of the modified electromagnetic wave is shifted in frequency by a fixed amount relative to the incident electromagnetic wave. (i.e. the modified electromagnetic wave approximates a wave reflected from a surface moving continuously at velocity v). Alternatively or additionally, in cases where the where the incident electromagnetic wave has a frequency bandwidth, controller 130 may be configured to dynamically change the effective position of the selected spatial profile so that a portion of the energy of the modified electromagnetic wave has a frequency translated outside the frequency bandwidth of the incident electromagnetic wave. Controller 130 may vary the effective position of the selected spatial profile so that a portion of the energy of the modified electromagnetic wave is shifted in frequency by a fixed amount (e.g., $\Delta f \approx v/c$) relative to the incident electromagnetic wave so that the modified electromagnetic wave approximates a wave reflected from a surface moving continuously at a velocity$\approx$v.

Controller 130 may be configured to dynamically change the effective position of the selected spatial profile according to a random or pseudo-random pattern such that any temporal phase coherence in the modified electromagnetic wave is reduced or eliminated. Alternatively or additionally, controller 130 may be configured to dynamically change the effective position of the selected spatial profile at a rate sufficient to substantially reduce a temporal phase correlation of the incident and the modified electromagnetic waves. Controller 130 may be configured to dynamically change the effective position of the selected spatial profile according to a pattern having selected amplitude and frequency components so that for at least one incident electromagnetic wave frequency the modified electromagnetic wave is substantially phase-continuous or jumps in phase by full wavelengths Controller 130 may be configured to vary the effective position of the selected spatial profile according to a linear repeating pattern (e.g., a saw tooth shaped profile). In cases where the incident electromagnetic wave has a time-varying frequency [a chirp] controller 130 may be configured to dynamically vary the effective position of the selected spatial profile with a substantially different chirp rate than the incident electromagnetic wave. Controller 130 may use frequency information sensed by sensor 140 or received from other sources to do determine the rate at which the effective position should be changed.

The spatial profile of the at least one eledromagnetic parameter in the material may be selected to act as a reflector of the incident electromagnetic wave. The selected profile may provide partial reflections so that the modified electromagnetic wave is effectively a sum of reflections from a first surface and a second surface. (See e.g., FIG. 12C). Further, controller 130 may be configured to dynamically vary a property (e.g., position, shape or strength) of the selected spatial profile to vary reflectivity or impedance so that a ratio of the amplitudes of the reflections from the first and second surface is time-dependent. FIG. 15 shows for example, a material block 110 in which the spatial profile of the at least one electromagnetic parameter (e.g., refractive index) is dynamically varied to present reflective steps (e.g., Step 1 and Step 2) having time-varying amplitudes. In particular, the figure shows Step 1 decreasing from its maximum value to zero and conversely Step 2 increasing from zero to its maximum value, over a finite time interval. Accordingly, the ratio of the amplitudes of the waves (1 and 2) that are reflected by steps 1 and 2 may change as a function to the relative heights of the two steps.

It will be understood that while FIG. 1 shows an exemplary a rectangular step-like feature 120 in the spatial distribution of an electromagnetic parameter, various implementations of apparatus 100 may include any suitable selected spatial profile of at least one electromagnetic parameter in the material. The selected spatial profile may, for example, have a pulse-like shape. Alternatively, the selected spatial profile may be a sequence of spatial steps arranged to act as a Bragg diffraction grating.

In three dimensions, the selected spatial profile may present a planar surface to the incident electromagnetic wave or a curved surface, which may focus or defocus the incident electromagnetic wave. When the selected spatial profile is interior to the material it may define an outward material layer extending from a spatial feature in the profile to an exterior surface of the material (FIG. 1). Controller 130 may be configured to adjust the spatial distribution of electromagnetic parameters in the material so that the outward material layer has a desired interfacial property. Controller 130 may, for example, adjust the spatial distribution so that an electromagnetic impedance $\eta$ of the outward material layer matches that of a medium across the external surface of the material and/or provides a reflection-free external surface.

In exemplary implementations of apparatus 100, the material in block 110 may include materials which exhibit a negative index of refraction under select conditions. Such an apparatus 100 may be configured so that the negative index of refraction characteristics give rise to phase reversal in the modification of the incident electromagnetic wave.

Figure 16B:
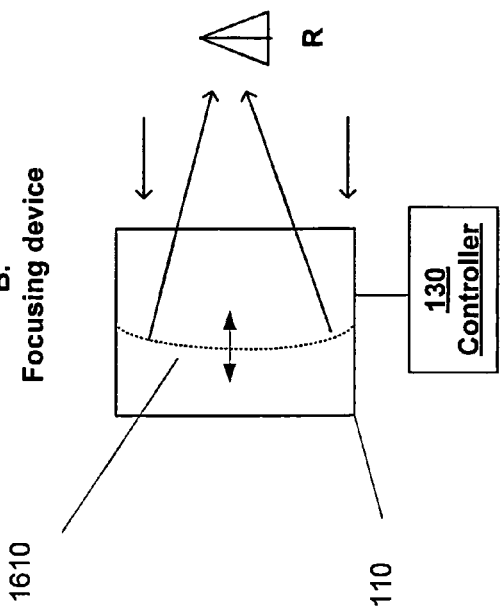
Figure 16A:
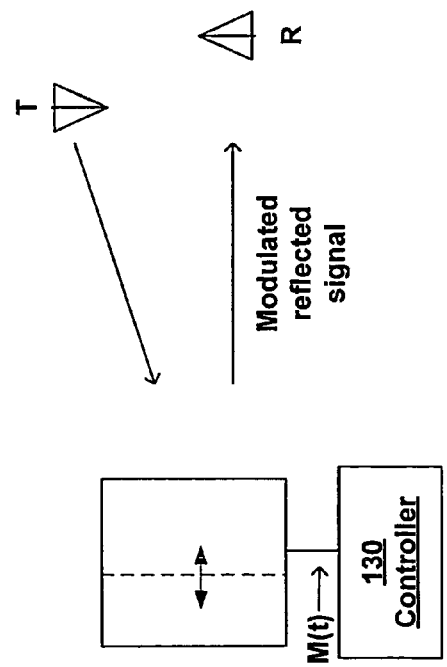

In an exemplary implementation, apparatus 100 may be configured to act as a passive transponder. (See e.g., FIG. 16A).

In further exemplary implementations, apparatus 100 may be configured to redirect the incident electromagnetic wave in a specified direction. FIG. 16 B shows, for example, apparatus 100 configured to operate as a focusing device. Controller 130 may be used to modify the spatial profile of the at least one electromagnetic parameter in the material block 110 to present a suitable surface (e.g., curved surface 1610) for focusing the incident electromagnetic waves toward a focal point.

Figure 16C:
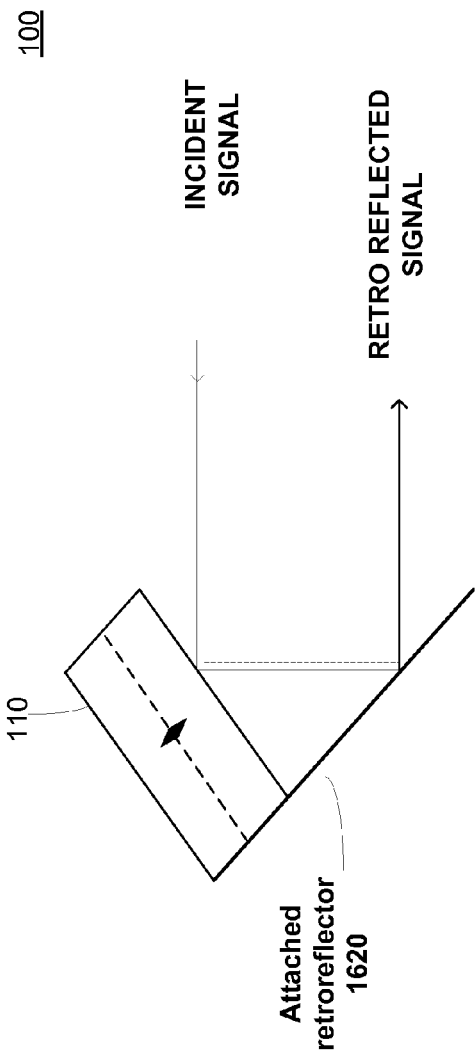
Figure 16D:
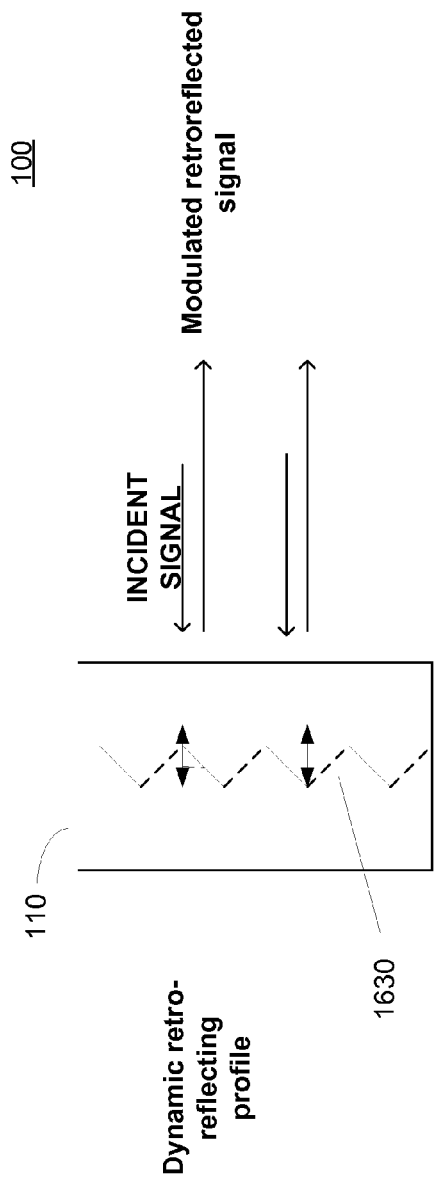

In an exemplary implementation apparatus 100 may, for example, include suitable retro reflector structures (e.g., corner cube structures) disposed in the material to redirect the incident electromagnetic wave in the specified direction. FIG. 16C shows, for example, apparatus 100 having an attached corner cube mirror surface 1620. Surface 1620 may be suitably disposed relative to block 110 so that electromagnetic waves incident on block 110 are retro reflected of surface 1620. block 110 to incident electromagnetic waves are retro reflected. Alternatively, material block 110 itself may be configured to act as a retroreflector, for example, by selection of a suitable spatial profile of the at least one electromagnetic parameter therein. FIG. 16D shows an exemplary retro-reflective profile 1630, which may be dynamically generated by controller 130 in material block 110.

Apparatus 100 may also include an electromagnetic radiation detector 150 coupled to block 110 and controller 130. Such an apparatus 100 may be configured to operate as a demodulator and/or signal correlator.

Figure 16F:
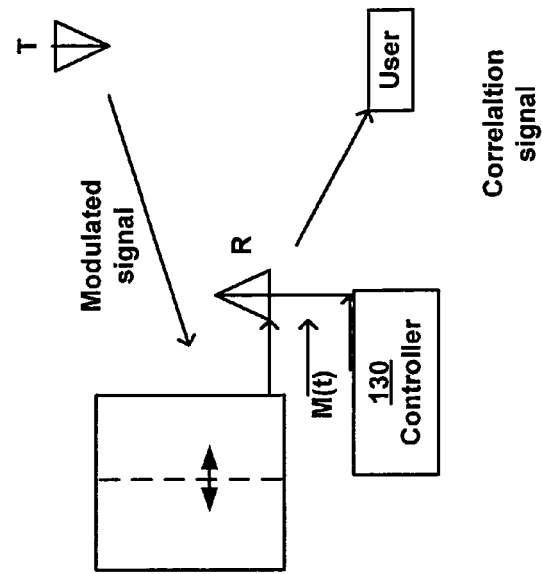
Figure 16E:
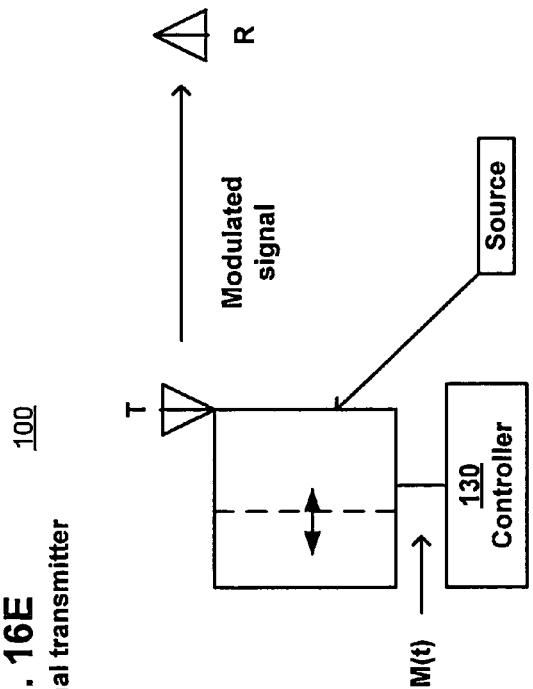

In general, controller 130 may be configured to modulate an amplitude, a direction, a phase, and/or a frequency of the incident electromagnetic wave according to an information carrying signal. In an exemplary implementation of apparatus 100, a source 160 of the incident electromagnetic wave may be coupled to block 110 so that apparatus 100 can operate as a signal transmitter. FIG. 16E shows an exemplary configuration of apparatus 100 configured to operate as a signal transmitter. An external source provides electromagnetic radiation, which is modulated according to a signal m(t) applied to controller 13. The modulate signal is transmitted to a receiver. Conversely, FIG. 16F shows an exemplary configuration of apparatus 100 configured to operate as a signal receiver/demodulator. A variable path delay introduced by block 110 may result in a frequency shift so that the receiver can operate at a different frequency than the transmitter frequency, for example, to avoid interference. Alternatively, block 110 may operate to demodulate or correlate the phase modulation present on the transmitted signal.

Figure 3:
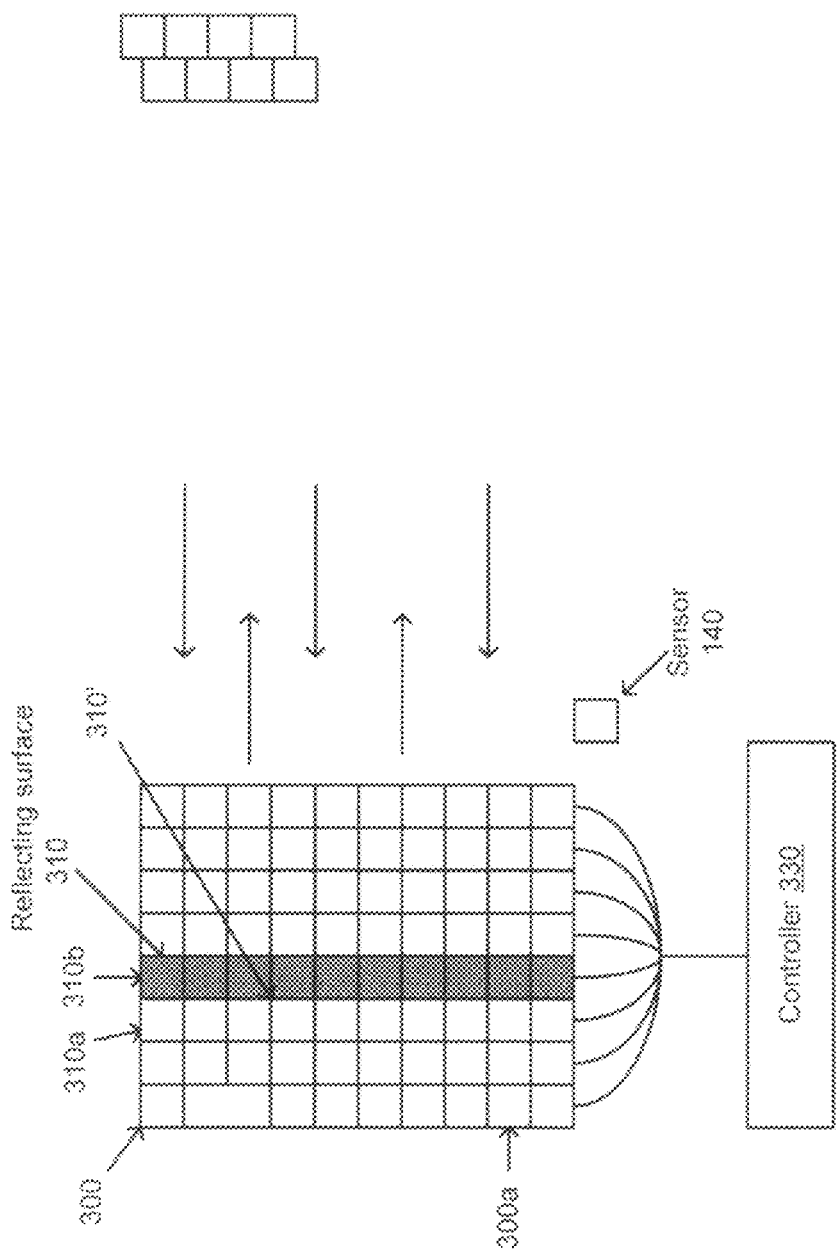
FIGS. 3 and 4 are schematic diagrams illustrating an exemplary variable reflector made of artificially-structured elements, in accordance with the principles of the solutions described herein

FIG. 3 shows an exemplary apparatus 300, which is configured to act as a variable reflector. Apparatus 300 includes two or more layers of reflective material (e.g., layers 310a and 310b), at least one layer being made or controllable metamaterial elements (e.g., elements 300a). Apparatus 300 may also include a controller 330 (e.g., controller 130) which applies suitable control signals to the controllable layers to vary the position of an effective reflective surface (e.g., surface 310). Like apparatus 100, apparatus 300 may operate as a passive transponder.

An exemplary version of apparatus 300 includes a stack of one or more layers (e.g., layers 310a and 310b) having controllable reflective properties provided by metamaterial elements (e.g., elements 300a) therein. Controller 330 may be configured to adjust the controllable reflective properties of at least one layer by applying one or more of an electric field, an electric current, a magnetic field, electromagnetic energy, light, heat, mechanical stress or strain, acoustic and/or ultrasound energy to the at least one layer. In operation, controller 330 may be dynamically adjust the controllable reflective properties of the one or more layers to present an effective reflective surface at varying positions (e.g., position 310 and 310') or orientations in the stack as a function of time. The variations in position or orientation of the effective reflective surface may introduce a time-varying path delay d (t) in a reflected electromagnetic wave relative to the incident electromagnetic wave.

As in apparatus 100, controller 330 in apparatus 300 may be configured so that the introduced time-varying path delay d (t) is, for example, a substantially pseudo-random or random function of time, or a substantially periodic function of time. The time-varying path delay d(t) may be a substantially continuous function of time over a time interval substantially larger than a cycle (1/f) of the incident electromagnetic wave. The function may have first or second order discontinuities, which may define the intervening time interval over which it is continuous. Exemplary time-varying path delay d (t) functions are linear (e.g., $d(t) \approx \alpha t + \beta_0$) or quadratic (e.g., $d(t) \approx \alpha t^2 + \beta t + \gamma_0$) in time.

The time-varying phase shift $\phi(t)$ may be a selected function such that the stack of one or more layers has an apparent velocity ($\approx d\phi(t)/dt$) and/or an apparent acceleration ($\approx d^2\phi(t)/d^2t$) that are different than an actual velocity and/or acceleration, respectively. In the case of a linearly varying path delay d (t) (e.g., $d(t) \approx \alpha t + \beta_0$), a frequency f' of the modified electromagnetic wave may be shifted relative to a frequency f of the incident electromagnetic wave by an amount $\delta f(\approx \alpha/2\pi)$.

The stack of one or more layers with controllable reflective properties may constitute a volume of a material that has a change in state that moves through it in response to a spatially varying signal applied by controller 330.

Controller 330 may be configured to dynamically change an effective position of the reflective surface (e.g., surface 310) to time-modulate properties (e.g., the phase) of the reflected electromagnetic wave. Controller 330 may adjust the controllable reflective properties of at least one layer in response to an external signal and/or external command so that apparatus 300 operates as an variable optical element or delay. The external signal may, for example, be an information carrying signal, and controller 330 may be is configured to adjust the controllable reflective properties so that the reflected electromagnetic wave is modulated in direction, amplitude, phase and/or or frequency according to the information carrying signal.

Each layer with controllable reflective properties in the stack may have a plurality of states including at least a reflective state, a transmissive state and/or a variable index state. The reflective state and transmissive states may be only partially so. Further, the plurality of states of a layer may include a state in which at least a portion of the layer has a negative index of refraction under select conditions.

Controller 330 may be configured to switch a layer with controllable reflective properties between its states.

With renewed reference to FIG. 3, at least one of the layers with controllable reflective properties in apparatus 300 has a substantially uniform thickness. This feature may allow a reflected wavefront shape to remain unchanged. At least one of the layers may have a thickness of less than about 0.03 of a wavelength of the incident electromagnetic wave in the stack. Such a layer thickness may correspond to a change in phase of the modified electromagnetic wave of less than about $0.06*\pi$ radians. Alternatively or additionally, at least one of the layers with controllable reflective properties may have a thickness equal to or larger than about 0.03 of a wavelength of the incident electromagnetic wave in the stack. Such a layer thickness may correspond to a change in phase of the modified electromagnetic wave of about $0.06*\pi$ radians. Further, at least one of the layers with controllable reflective properties may have a thickness equal to or larger than 0.25 of a wavelength of the incident electromagnetic wave. Such a layer thickness may correspond to a change in phase of the modified electromagnetic wave of about $0.5*\pi$ radians.

Figure 4:
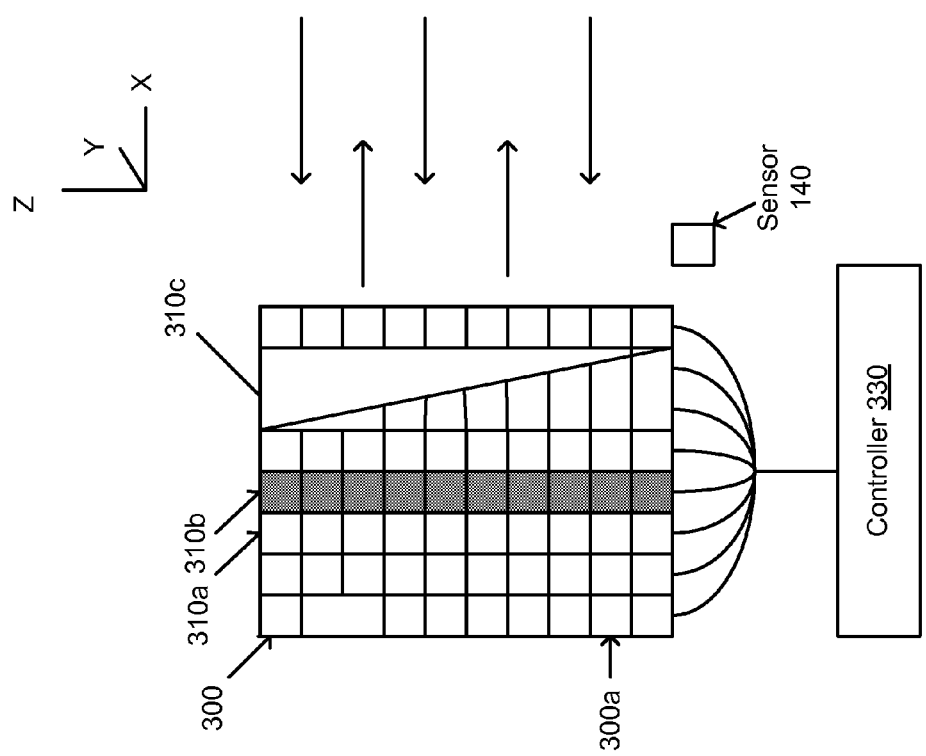

Alternatively or additionally, at least one of the layers (e.g., layer 310c, FIG. 4) with controllable reflective properties may have a substantially varying thickness in a transverse direction. The thickness may, for example, vary substantially linearly along a transverse axis. Such a layer may operate as a variable prism on the incident electromagnetic wave. Alternatively, the thickness may vary substantially quadratically along a transverse axis. Such a layer may operate as a variable lens. In general, one or more of the layers with controllable reflective properties may have a substantially concave and/or convex shape. Layers with substantially uniform thickness may be planar or may have a curved shape. The different shapes of the layers may be selected with in consideration of a desired shape of the reflective surface (e.g., surface 310) to be presented to the incident electromagnetic wave.

Like in apparatus 100, controller 330 in apparatus 300 may be configured to modulate an amplitude, a direction, a phase, and/or a frequency of the incident electromagnetic wave according to an information carrying signal. Like apparatus 100, apparatus 300 may also include an electromagnetic radiation detector 150. Such an apparatus 300 may be configured to operate as a demodulator and/or signal correlator. Similarly like apparatus 100, apparatus 300 may include a source 160 of the incident electromagnetic wave so that apparatus 300 can operate as a signal transmitter.

In exemplary implementations of apparatus 300, controller 330 may be configured to dynamically change the effective position of the reflective surface at a rate substantially different that an actual velocity v of the stack. Controller 330 may, for example, vary an effective position of the reflecting surface so that a reflected electromagnetic wave is shifted in frequency by a fixed amount to simulate reflection, for example, from a continuously moving surface. Controller 330 may be configured to change the effective position of the reflective surface cyclically with a cycle frequency about equal to or greater than a modulation frequency of the incident electromagnetic wave. The effective position of the reflective surface may be dynamically changed so that a portion of energy of the reflected electromagnetic wave has a frequency translated outside a pre-defined frequency band of a receiver of the modified electromagnetic wave. Additionally of alternatively, a portion of the energy of the reflected electromagnetic wave may have a frequency translated outside the frequency band width of the incident electromagnetic wave.

Controller 330 may be configured to change the effective position of the reflective surface in apparatus 300 at a rate sufficient to substantially reduce a temporal phase correlation of the incident and the reflected electromagnetic waves. For example, controller 330 may vary the effective position of the reflective surface according to a random or pseudo-random pattern such that any temporal phase coherence in the reflected radiation is reduced or eliminated. In instances where the incident electromagnetic wave has a time-varying frequency [a chirp], controller 330 may be configured to dynamically vary the effective position of the reflective surface with a chirp rate substantially different than that of the incident electromagnetic wave.

Controller 330 may be configured to vary an effective position of the reflective surface in a repeating pattern (e.g., in a linear saw tooth pattern). The repeating pattern may be selected to have particular amplitude and frequency components so that for at least one incident electromagnetic wave frequency, the reflected electromagnetic wave is substantially phase-continuous. The effective position of the reflective surface may be varied so that the reflected electromagnetic wave is effectively a sum of reflections from a first surface and a second surface. Further, controller 330 may vary the effective position of the reflective surface so that a relative amplitude of the reflections from the first and second surface is time-dependent (e.g., such that the "new" reflecting surface can "fade in" over the old one, rather than jumping abruptly).

In general, apparatus 300 may be configured to redirect the incident electromagnetic wave in a specified direction. Apparatus 300 may include a retro reflector. The retro reflector may, for example, include corner cube structures disposed in the stack of one or more layers. Alternatively or additionally, the one or more layers with controllable reflective properties may themselves be configured to act as a retroreflector.

In apparatus 300, the one or more layers with controllable reflective properties may include a photonic bandgap material, a metamaterial, and/or a broadband metamaterial (e.g., optically-switched metamaterial elements, electrically and/or electro-magnetically-switched metamaterial elements). The one or more layers may include one or more materials that exhibit a negative index refraction at least under select conditions. Controller 330 may be configured to apply an optical signal having a defined wavelength and/or intensity, an electrical and/or an electro-magnetic signal as appropriate to the metamaterial elements to switch one or more of the layers between reflective and transmissive states.

FIG. 5 shows an exemplary apparatus 500, which is configured to act as a variable phase or time delay. Apparatus 500 includes two or more layers of transmissive material (e.g., layers 510a and 510b) having controllable indices of refraction. At least one layer may be made of controllable metamaterial elements (e.g., elements 500a). Apparatus 500 includes a controller 530 (e.g., controller 130 or controller 330) which applies suitable control signals to one or more of the controllable layers to vary their indices of refraction. Like apparatuses 100 and 300, apparatus 500 may operate as a passive transponder.

An exemplary version of apparatus 500 includes a stack of one or more layers (e.g., layers 510a and 510b) having controllable transmissive properties (e.g., controllable indices of refraction) provided by metamaterial elements (e.g., elements 500a) therein. Controller 530 may be configured to dynamically adjust the controllable indices of refraction of the one or more layers to at least partially transmit an incident electromagnetic wave having a frequency f, and to introduce a time-varying path delay d (t) in a transmitted electromagnetic wave relative to the incident electromagnetic wave to introduce a time-varying path delay d (t) in a reflected electromagnetic wave relative to an incident electromagnetic wave. Controller 530 may adjust the indices of refraction of at least one layer by applying one or more of an electric field, an electric current, a magnetic field, electromagnetic energy, light, heat, mechanical stress or strain, acoustic and/or ultrasound energy to the at least one layer.

Controller 530 in apparatus 500 may be configured so that the introduced time-varying path delay d (t) is, for example, a substantially pseudo-random or random function of time, or a substantially periodic function of time. The time-varying path delay d(t) may be a substantially continuous function of time over a time interval substantially larger than a cycle (1/f) of the incident electromagnetic wave. The function may have first or second order discontinuities, which may define the intervening time interval over which it is continuous. Exemplary time-varying path delay d (t) functions are linear (e.g., $d(t) \approx \alpha t + \beta_0$) or quadratic (e.g., $d(t) \approx \alpha t^2 + \beta t + \gamma_0$) in time.

The time-varying phase shift $\phi$ (t) may be a selected function such that the material has an apparent velocity ($\approx d\phi(t)/dt$) and/or an apparent acceleration ($\approx d^2\phi(t)/dt^2$) that are different than its actual velocity and/or acceleration, respectively. In the case of a linearly varying path delay d (t) (e.g., $d(t) \approx \alpha t + \beta_0$), a frequency f' of the modified electromagnetic wave may be shifted relative to a frequency f of the incident electromagnetic wave by an amount $\delta f(\approx \alpha/2\pi)$.

The one or more layers with controllable indice's of refraction may constitute a volume of a material that has a change in state that moves through it in response to a spatially varying signal applied by controller 530.

Controller 530 may be configured to dynamically change the controllable indices of refraction to time-modulate properties (e.g., the phase) of the transmitted electromagnetic wave. Controller 530 may adjust the controllable indices of refraction of at least one layer in response to an external signal and/or external command so that apparatus 500 operates as an variable phase or time delay. The external signal may, for example, be an information carrying signal, and controller 530 may be is configured to adjust the controllable indices of refraction so that the transmitted electromagnetic wave is modulated in direction, amplitude, phase and/or frequency according to the information carrying signal.

Each layer with controllable indices of refraction may have a plurality of states including at least a reflective state, a transmissive state and/or a variable index state. The reflective state and transmissive states may be only partially so. Controller 530 may be configured to switch a layer with controllable indices of refraction between its states. Further, the plurality of states of a layer may include a state in which at least a portion of the layer has a negative index of refraction under select conditions.

With renewed reference to FIG. 5, at least one of the layers with controllable indices of refraction in apparatus 530 may have a substantially uniform thickness. This feature may, for example, allow a transmitted wavefront shape to remain unchanged. At least one of the layers may have a thickness of less than about 0.03 of a wavelength of the incident electromagnetic wave in the stack. Such a layer thickness may correspond to a change in phase of the modified electromagnetic wave of less than about $0.06*\pi$ radians. Alternatively or additionally, at least one of the layers with controllable indices of refraction may have a thickness equal to or larger than about 0.03 of a wavelength of the incident electromagnetic wave in the stack. Such a layer thickness may correspond to a change in phase of the modified electromagnetic wave of about $0.06*\pi$ radians. Further, at least one of the layers with controllable indices of refraction may have a thickness equal to or larger than 0.25 of a wavelength of the incident electromagnetic wave. Such a layer thickness may correspond to a change in phase of the modified electromagnetic wave of about $0.5*\pi$ radians.

Alternatively or additionally, at least one of the layers with controllable indices of refraction may have a substantially varying thickness in a transverse direction. The thickness may, for example, vary substantially linearly along a transverse axis. Such a layer may operate as a variable prism on the incident electromagnetic wave. Alternatively, the thickness may vary substantially quadratically along a transverse axis. Such a layer may operate as a variable lens. In general, one or more of the layers with controllable indices of refraction may have a substantially concave and/or convex shape. Layers with substantially uniform thickness may be planar or may have a curved shape. The different shapes of the layers may be selected with in consideration of a desired shape of the modified wavefront surface with respect to that of the incident electromagnetic wave.

In exemplary implementations of apparatus 500, a first of pair of layers may have a thickness that varies substantially linearly along a first transverse axis and a second of the pair of layers may have a thickness that varies substantially linearly along a second transverse axis. The first of pair of layers may have a thickness that increases along the transverse axis and the second of the pair of layers may have a thickness that decreases along the transverse axis. In a further exemplary implementation of apparatus 500, at least one of the layers having controllable indices of refraction may have a thickness profile corresponding to a Zernike polynomial (or other polynomial of an orthogonal set of polynomials). Such a thickness profile may compensate for optical aberrations in the modified electromagnetic wave.

Like in apparatuses 100 and 300, controller 530 in apparatus 500 may be configured to modulate an amplitude, a direction, a phase, and/or a frequency of the incident electromagnetic wave according to an information carrying signal. Like apparatus 100, apparatus 500 may also include an electromagnetic radiation detector 150. Such an apparatus 500 may be configured to operate as a demodulator and/or signal correlator. Similarly like apparatus 100, apparatus 500 may include a source 160 of the incident electromagnetic wave so that apparatus 500 can operate as a signal transmitter.

In exemplary implementations of apparatus 500, controller 530 may be configured to dynamically change the indices of refraction at a rate substantially different that an actual velocity v of the stack. Controller 530 may, for example, vary an index of refraction of a transmissive layer so that a transmitted electromagnetic wave is shifted in frequency by a fixed amount simulating reflection, for example, from a continuously moving surface. Controller 530 may be configured to change the index of refraction of a transmissive layer cyclically with a cycle frequency about equal to or greater than a modulation frequency of the incident electromagnetic wave. The index of refraction the transmissive layer may be dynamically changed so that a portion of energy of the transmitted electromagnetic wave has a frequency translated outside a pre-defined frequency band of a receiver of the modified electromagnetic wave. Additionally of alternatively, a portion of the energy of the transmitted electromagnetic wave may have a frequency translated outside the frequency band width of the incident electromagnetic wave.

Controller 530 may be configured to change the index of refraction a transmissive layer in apparatus 500 at a rate sufficient to substantially reduce a temporal phase correlation of the incident and the transmitted electromagnetic waves. For example, controller 530 may vary the index of refraction of a transmissive layer according to a random or pseudo-random pattern such that any temporal phase coherence in the transmitted radiation is reduced or eliminated. In instances where the incident electromagnetic wave has a time-varying frequency [a chirp], controller 530 may be configured to dynamically vary the index of refraction of a transmissive layer with a chirp rate substantially different than that of the incident electromagnetic wave. Controller 530 may be configured to vary index of refraction in a repeating pattern (e.g., in a linear saw tooth pattern). The repeating pattern may be selected to have particular amplitude and frequency components so that for at least one incident electromagnetic wave frequency, the transmitted electromagnetic wave is substantially phase-continuous.

In general, apparatus 500 may be configured to redirect the incident electromagnetic wave in a specified direction. Apparatus 500 may include a retro reflector. The retro reflector may, for example, include corner cube structures disposed in the stack of one or more layers. Alternatively or additionally, the one or more layers with controllable indices of refraction may themselves be configured to act as a retroreflector.

In apparatus 500, the one or more layers with controllable indices of refraction may include a metamaterial, and/or a broadband metamaterial (e.g., optically-switched metamaterial elements, electrically and/or electro-magnetically-switched metamaterial elements). The one or more layers may include one or more materials that exhibit a negative index refraction at least under select conditions. The one or more layers having controllable indices of refraction may form a volume of a material that has a change in state that moves through it in response to a spatially varying signal applied by controller 530.

Controller 530 may be configured to apply an optical signal having a defined wavelength and/or intensity, an electrical and/or an electro-magnetic signal as appropriate to the metamaterial elements to switch one or more of the layers between different index of refraction states.

The transmissive layers in apparatus 500 may be partially reflective. The effective position of the reflective surface may be varied so that the reflected electromagnetic wave is effectively a sum of reflections from a first surface and a second surface. Further, controller 530 may vary the effective position of the reflective surfaces so that a relative amplitude of the reflections from the first and second surfaces is time-dependent (e.g., such that the "new" reflecting surface can "fade in" over the old one, rather than jumping abruptly).

Apparatus 500 may further include an optional reflective surface (e.g., posterior reflector 550) disposed at or about a posterior surface of the stack of layers having controllable indices of refraction (FIG. 6). Posterior reflector 550 may be configured reflect at least a portion of the electromagnetic wave transmitted by the stack of layers. Posterior reflector 550 may be made of any suitable material including, for example, metal and/or a photonic bandgap material.

With reference to FIG. 6, controller 530 may be configured to adjust the controllable indices of refraction of the one or more layers to change an apparent optical depth and/or angle of the posterior reflector presented to the incident electromagnetic wave. Controller 530 may be configured to vary an effective optical depth of the posterior reflector according to a random or pseudo-random pattern such that any phase coherence in the reflected radiation is reduced or eliminated. Controller 530 may be configured to adjust the controllable indices of refraction to vary the effective optical depth of the posterior reflector in a repeating pattern (e.g., a linear saw tooth pattern). The repeating pattern may be selected to have amplitude and frequency components so that for at least one incident electromagnetic signal frequency, the reflected electromagnetic signal is substantially phase-continuous.

Controller 530 may, for example, vary an effective optical depth of the posterior reflector so that a reflected electromagnetic wave is shifted in frequency by a fixed amount simulating reflection by a continuously moving surface.

Controller 530 may be configured to dynamically vary the controllable indices of refraction of the layers to generate a variable partially reflecting surface or a variable partially reflecting Bragg reflector in the stack so that a reflected electromagnetic signal is effectively a sum of a first reflection from the posterior reflector and a second reflection from the partially reflecting surface or partially reflecting Bragg reflector. Controller 530 may be configured to dynamically vary the controllable indices of refraction such that a relative amplitude of the first and second reflections is time-dependent (i.e., the "new" reflecting surface can "fade in" over the old one, rather than jumping abruptly).

Apparatus 500 may further include an optional anterior partially reflecting surface (e.g., anterior reflector 560) disposed at or about an anterior surface of the stack of layers having controllable indices of refraction (FIG. 6). Such an apparatus 500 with an optional anterior reflector or a reflective backing layer may operate as a variable reflector.

The anterior reflector may be configured to reflect at least a first portion of the incident wave electromagnetic wave, and controller 530 may be further configured to dynamically vary the controllable indices of refraction and to generate a variable partially reflecting surface or a variable partially reflecting Bragg reflector (e.g.; Bragg reflector 570) in the stack so that a reflected electromagnetic signal is effectively a sum of a first reflection from the anterior reflector and a second reflection from the partially reflecting surface or partially reflecting Bragg reflector. Like posterior reflector 550, anterior reflector 560 may be made of any suitable material including, for example, metal and/or a photonic bandgap material.

FIG. 7 shows another apparatus (e.g., apparatus 700), which is configured to operate as a variable reflector or phase or time delay. Apparatus 700 may be composed of artificially structured material having variable reflective, transmissive or refractive index states that are switched on or off by an applied field or control signal. The states may include a state in which at least a portion of the material has a negative index of refraction under select conditions. The threshold for switching between the states switching may vary across the material. External signals of different strengths may be applied to the material to switch layers of the material to different states as a function of depth in the layer, such that the effective position of a reflecting surface within the material or the effective optical thickness of the material at one or more wavelengths is dynamically varied.

Apparatus 700 may, for example, include a block of material 710 made from an artificially structured material having a controllable index of refraction responsive to an applied field (F), and a controller 730 configured to apply a field (F) to the material to induce a spatially varying index of refraction profile in the material and to further temporally vary the applied field and the corresponding spatially varying index of refraction profile so as to introduce a time-varying path delay d (t) in a modified electromagnetic wave relative to an incident electromagnetic wave.

Material 710 may, for example, be a dielectric material, and the applied field F may be a voltage applied across material block 710 by controller 730 via electrodes 720. Electrodes 720 may, for example, be made from conductive semi-transparent materials (e.g., indium oxide). Material may have an index of refraction n (x, F), which is a spatially varying function of the applied field F. For example, the index of refraction of material 710 may have switching threshold between a first value (e.g., n1) and a second value (n2) with respect to the applied field F. FIG. 7 shows, for example, material 710 in which a switching threshold varies (e.g., linearly) as function of depth in the material. An application of a substantially uniform field F spatially across material 710 which may result in a sub-threshold layer of the material with refractive index state n1 and another a super-threshold layer of the material with refractive index state n2.

In other implementations of apparatus 700, material 710 may be optical material having artificially structured intensity-dependent light absorption properties, and the applied field F may be a spatially varying light intensity. Other types of material 710, which are responsive to other types of fields (e.g., an electrical field, a magnetic field, and/or other energy field), may be deployed. Controller 730 may be configured to adjust the spatially varying index of refraction profile in the material by applying one or more of an electric field, an electric current, a magnetic field, mechanical strain, ultrasound, and/or light. Material 710 having a controllable index of refraction may, for example, include optically-switched metamaterial elements, electrically and/or electro-magnetically-switched metamaterial elements. In such case, controller 730 may, for example, be configured to apply an optical signal having a defined wavelength and/or intensity, an electrical and/or electro-magnetic signal as appropriate to adjust the spatially varying index of refraction profile in the material. In general, material 710 includes a volume of a material that has a change in state that moves through it in response to a spatially varying signal applied by the controller.

With renewed reference to FIG. 7, the layers of the material with refractive index states n1 and n2 may effectively act as a reflective or partially reflective surface 730. Controller 730 may be configured to vary the applied field (F) to vary the effective position of surface 740 to introduce the time-varying path delay d (t) in the path of the incident electromagnetic wave.

As in apparatuses 100, 300 and 500, the time-varying path delay d (t) may, for example, be a substantially pseudo-random or random function of time or a substantially periodic function of time. The time-varying path delay d(t) may be a substantially continuous function of time over a time interval substantially larger than a cycle (1/f) of the incident electromagnetic wave. The function may have first or second order discontinuities, which may define the intervening time interval over which it is continuous. Exemplary time-varying path delay d (t) functions are linear (e.g., d(t)≈αt+β$_0$) or quadratic (e.g., d(t)≈αt$^2$+βt+γ$_0$) in time.

The time-varying phase shift φ (t) may be a selected function such that the material has an apparent velocity (≈dφ(t)/dt) and/or an apparent acceleration (≈d$^2$φ(t)/d$^2$t) that are different than its actual velocity and/or acceleration, respectively. In the case of a linearly varying path delay d (t) (e.g., d (t)≈αt+β$_0$), a frequency f of the modified electromagnetic wave may be shifted relative to a frequency f of the incident electromagnetic wave by an amount δf(≈α/2π).

With renewed reference to FIG. 5, at least one of the layers with controllable indices of refraction in apparatus 500 may have a substantially uniform thickness. This feature may, for example, allow a transmitted wavefront shape to remain unchanged. At least one of the layers may have a thickness of less than about 0.03 of a wavelength of the incident electromagnetic wave in the stack. Such a layer thickness may correspond to a change in phase of the modified electromagnetic wave of less than about 0.06*π radians. Alternatively or additionally, at least one of the layers with controllable indices of refraction may have a thickness equal to or larger than about 0.03 of a wavelength of the incident electromagnetic wave in the stack. Such a layer thickness may correspond to a change in phase of the modified electromagnetic wave of about 0.06*π radians. Further, at least one of the layers with controllable indices of refraction may have a thickness equal to or larger than 0.25 of a wavelength of the incident electromagnetic wave. Such a layer thickness may correspond to a change in phase of the modified electromagnetic wave of about 0.5*π radians.

Controller 730 may be configured to vary index of refraction in a repeating pattern (e.g., in a linear saw tooth pattern). The repeating pattern may be selected to have particular amplitude and frequency components so that for at least one incident electromagnetic wave frequency, the transmitted electromagnetic wave is substantially phase-continuous. Further, controller 730 may be configured to dynamically change the spatially varying index of refraction profile in the material so that a portion of energy of the modified electromagnetic wave has a frequency translated outside a pre-defined frequency band of a receiver of the modified electromagnetic wave. In instances where the incident electromagnetic wave has a frequency band width, controller 730 may dynamically change the spatially varying index of refraction profile in the material so that a portion of energy of the modified electromagnetic wave has a frequency translated outside the frequency band width of the incident electromagnetic wave. In instances where the incident electromagnetic wave has controller 730 may dynamically change to the applied field (F) with a substantially different chirp rate than that of the incident electromagnetic wave.

Further, controller 730 may be configured to dynamically vary the spatially varying index of refraction profile in the material at a rate sufficient to substantially reduce a temporal phase correlation of the incident and the modified electromagnetic waves. Controller 730 may be configured to vary the spatially varying index of refraction profile in the material according to a pattern having selected amplitude and frequency components so that for at least one incident electromagnetic wave frequency the modified electromagnetic wave is substantially phase-continuous (i.e., jumps in phase by full wavelengths). Controller 730 also may for example, be configured to vary the spatially varying index of refraction profile in the material so that the modified electromagnetic wave is shifted in frequency by a fixed amount relative to the incident electromagnetic wave to simulate, for example, a continuously moving surface.

Like apparatus 500, apparatus 700 may further include a posterior reflective surface or reflector (e.g., reflector 550) disposed on or about a posterior surface of the material. The posterior reflective surface may be configured to reflect at least a portion of the modified electromagnetic wave.

Controller 730 may be configured to change the spatially varying index of refraction profile in the material to change an apparent optical depth and/or angle of the posterior reflector presented to the incident electromagnetic signal. Controller 730 may dynamically adjust the spatially varying index of refraction profile in the material to generate a partially reflecting surface (e.g., surface 740) so that a reflected electromagnetic signal is effectively a sum of reflections from the partially reflecting surface and the posterior reflector. Controller 730 may dynamically adjust the spatially varying index of refraction profile in the material such that a relative amplitude of the reflections from the partially reflecting surface and the reflector is time-dependent.

Like in apparatuses 100, 300 and 500, controller 730 in apparatus 700 may be configured to modulate an amplitude, a direction, a phase, and/or a frequency of the incident electromagnetic wave according to an information carrying signal. Further Like apparatuses 100, 300 and 500, apparatus 700 may also include an electromagnetic radiation detector 150. Such an apparatus 700 may be configured to operate as a demodulator and/or signal correlator. Similarly like apparatus 100, apparatus 700 may include a source 160 of the incident electromagnetic wave so that apparatus 700 can operate as a signal transmitter.

Controller 730 in apparatus 700 may be configured to apply fields so that the spatially varying index of refraction profile in material 710 has a step (e.g., at surface 740) at a substantially uniform depth in the material. A step in the refractive index at a uniform depth may yield a reflected or modified wavefront that does not change shape on reflection or transmission. Conversely, controller 730 may be configured applying field F so that the spatially varying index of refraction profile in the material has a step at substantially varying depths in the material. The spatially varying index of refraction profile in the material may have a step at a depth that varies substantially linearly along a transverse axis of the material so that the material can operate as a variable prism. Alternatively, the spatially varying index of refraction profile in the material may have a step at a depth that varies substantially quadratically along a transverse axis of the material so that the material can operate as a variable lens.

FIGS. 8-11 show exemplary features of methods 800-1100 for intercepting and modifying electromagnetic waves. The methods may involve deploying apparatuses, for example, of the types described with reference to FIGS. 1-7 (apparatuses 100-700) to intercept and modify incident electromagnetic waves.

Method 800 may include intercepting an incident electromagnetic wave with an artificially structured material (e.g., a photonic bandgap material, a metamaterial, a broadband metamaterial, etc.) having an adjustable spatial distribution of electromagnetic parameters (810), and dynamically adjusting the spatial distribution of electromagnetic parameters in the material to introduce a time-varying path delay d (t) in a modified electromagnetic wave relative to the incident electromagnetic wave 820). Method 900 may include intercepting an incident electromagnetic wave with a stack of one or more layers having controllable reflective properties provided by photonic bandgap materials, metamaterial or broadband metamaterial elements therein (910), and dynamically adjusting the controllable reflective properties of the one or more layers to present a reflective surface at varying depths and/or angles in the stack as a function of time to introduce a time-varying path delay d (t) in a reflected electromagnetic wave relative to the incident electromagnetic wave (920). Method 1000 may include intercepting an incident free space electromagnetic wave with a stack of one or more layers of transmissive materials, where the one or more layers with controllable index of refraction have controllable metamaterial elements therein (1010), and dynamically adjusting the controllable indices of refraction of the one or more layers to at least partially transmit an incident electromagnetic wave having a frequency f, and to introduce a time-varying path delay d (t) in a transmitted electromagnetic wave relative to the incident electromagnetic wave (1020). Method 1100 may include interposing an artificially structured material having a controllable index of refraction responsive to an applied field (F) in a path of an incident free space electromagnetic wave (1110), applying a field (F) to the material to induce a spatially varying index of refraction profile in the material (1120) and further temporally varying the applied field and the corresponding spatially varying index of refraction profile so as to introduce a time-varying path delay d (t) in a modified electromagnetic wave relative to an incident electromagnetic wave (1130).

In method 800, the intercepting material may include a distribution of discrete elements providing the adjustable spatial distribution of electromagnetic parameters. The discrete elements may, for example, be man-made photonic bandgap materials, metamaterial elements and/or broadband metamaterial elements. The spatial distribution of electromagnetic parameters in the material may, include a selected spatial profile of at least one electromagnetic parameter in the material. The selected spatial profile may, for example, have a rectangular step-like shape, a pulse-like shape, or may include a sequence of spatial steps or other structures configured to act like a Bragg diffraction grating. In three dimensions, a feature of the selected spatial profile (e.g., a step) may have a curved surface that focuses or defocuses the incident electromagnetic wave.

In method 800, dynamically adjusting the spatial distribution of electromagnetic parameters may include adjusting at least one property of the discrete elements to create a selected spatial profile in the values of an electromagnetic parameter in the material. Dynamically adjusting the spatial distribution of electromagnetic parameters may include modulating an amplitude, a direction, a phase, and/or a frequency of the incident electromagnetic wave according to an information carrying signal Method 800 may include dynamically adjusting the spatial distribution of electromagnetic parameters to vary an effective position of the selected spatial profile and to time-modulate a property (e.g., a phase) of the modified electromagnetic wave. Varying the effective position of the selected spatial profile may include one or more of a translation, a rotation, a tilt, a curvature change, a size and/or shape change of the selected spatial profile. Dynamically adjusting the spatial distribution of electromagnetic parameters may include varying an effective position of the selected spatial profile, for example, in response to an external signal, to time-modulate the phase of the modified electromagnetic wave. The effective position of the selected spatial profile may be varied, for example, over a distance smaller than, comparable to, or larger than a wavelength of the incident electromagnetic wave in the material.

In method 800, varying the effective position of the selected spatial profile at a rate substantially different that an actual velocity v of the material and/or at a rate about equal to or greater than a modulation frequency of the incident electromagnetic wave. Further, varying the effective position of the selected spatial profile may be such that a portion of energy of the modified electromagnetic wave has a frequency translated outside a pre-defined frequency band of a receiver of the modified electromagnetic wave and/or outside a outside the frequency band width of the incident electromagnetic wave. Method 800 may include varying the effective position of the selected spatial profile according to a random or pseudo-random pattern, a linear repeating pattern and/or a pattern having selected amplitude and frequency components so that for at least one incident electromagnetic wave frequency the modified electromagnetic wave is substantially phase-continuous. The effective position of the selected spatial profile may be varied at a rate sufficient to substantially reduce a temporal phase correlation of the incident and the modified electromagnetic waves and/or such that the modified electromagnetic wave is shifted in frequency by a fixed amount relative to the incident electromagnetic wave. In instances where the incident electromagnetic wave has a time-varying frequency [a chirp], method 800 may include varying the effective position of the selected spatial profile with a substantially different chirp rate than the incident electromagnetic wave.

Method 800 may include adjusting the selected spatial profile of the at least one electromagnetic parameter in the material to present one or more effectively reflective or partially reflective surfaces to the incident electromagnetic wave. The selected spatial profile may provide provides a partial reflection so that the modified electromagnetic wave is effectively a sum of reflections from a first surface and a second surface. Method 800 may include dynamically adjusting the spatial distribution of electromagnetic parameters to vary a property (e.g., position, shape, or strength) of the selected spatial profile to vary, for example, reflectivity, impedance or properties of the interposed material. The spatial distribution of electromagnetic parameters so that a relative amplitude of the reflections from the first and second surface is time-dependent.

A feature (e.g., a step) in the selected spatial profile may define an outward material layer extending from the feature to an exterior surface of the material. Method 800 may include adjusting the spatial distribution of electromagnetic parameters in the material so that outward material layer has a desired interfacial property. For example, properties of the outward material layer may be adjusted so that it has an electromagnetic impedance matching that of a medium across the external surface of the material and/or presents a reflection-free external surface.

In method 800, the intercepting material may include at least one layer switchable between a transmissive state and a reflective state. The transmissive and/or reflective state may be only partially so. The layer may exhibit a negative index of refraction at least under selected conditions. Method 800 may include applying a control signal to switch the at least one layer between its states. The control signal may, for example, be one or more of an electric field, an electric current, a magnetic field, an ultrasonic field, and a light wave. In instances where the intercepting material includes optically-switched metamaterial, the control signal may be an optical signal of having a defined wavelength and/or intensity.

Further in method 800, the intercepting material (e.g., a photonic bandgap material, a metamaterial, a broadband metamaterial) may include transmissive material having a variable refractive index. The material may exhibit a negative index of refraction under select conditions. The negative index of refraction may provide phase reversal in the modified electromagnetic wave.

Intercepting an incident electromagnetic wave with a stack of one or more layers having controllable reflective properties in method 900, intercepting an incident free space electromagnetic wave with a stack of one or more layers of transmissive materials in method 1000, and interposing an artificially structured material having a controllable index of refraction in method 1100, may include steps or processes that are the same or similar to the steps or processes method 800 for intercepting an incident electromagnetic wave with an artificially structured material having an adjustable spatial distribution of electromagnetic parameters (810). Likewise, dynamically adjusting the controllable reflective properties of the one or more layers (910) in method 900, and dynamically adjusting the controllable indices of refraction of the one or more layers (1010) in method 1000, and interposing an artificially structured material (1110) and applying and temporally a field (F) to the material to induce a spatially varying index of refraction profile in the material (1120-1130) in method 1100, may include steps of processes that are the same or similar to dynamically adjusting the spatial distribution of electromagnetic parameters (820) in method 800.

For example, in each of methods 800-1100, the time-varying path delay d(t) may be a substantially pseudo-random or random function of time, or a substantially periodic function of time. The time-varying path delay d(t) may be a substantially continuous function of time over a time interval substantially larger than a cycle of the incident electromagnetic wave and may have first and/or second order discontinuities. Exemplary time-varying path delays d(t) may be linear or quadratic functions of time over a time interval substantially larger than a cycle (1/f) of the incident electromagnetic wave. In the methods 800 and 1100, varying an effective position of the selected spatial profile and changing the spatially varying index of refraction profile may be carried out the in suitable distance increments (e.g., smaller than about 0.03, about 0.03, or equal to or larger than about 0.25 of a wavelength of the incident electromagnetic wave in the material). The thickness of at least one or the layers in methods 900 and 1000 may also correspond to similar distance increments.

In each of method's 800-1100, the intercepting or interposing material may constitute a volume of a material that has a change in state that moves through it in response to a spatially varying signal. The material may, for example, have electromagnetic parameter (e.g., an index of refraction n (x, F)) that is a spatially varying function of an applied field F. The electromagnetic parameter may have a switching threshold between a first value and a second value with respect to the applied field F. Methods 800-1100 may include applying a field F, which is substantially uniform across the material to switch portions of the material between the first electromagnetic parameter value and the second value. The applied field may for example, be electrical field and/or a magnetic field. In instances where the material includes optical material having artificially structured intensity-dependent light absorption properties, the applied field F may be a spatially varying light intensity. In instances where the material comprises dielectric material, the applied field F may be a voltage applied across the material.

Each of methods 800-1100 may include adjusting properties of the intercepting or interposing materials time-modulate the modified electromagnetic wave. The properties may be adjusted so that the modified/reflected/transmitted electromagnetic wave is modulated in direction, amplitude, phase and/or frequency according to an external signal external command and/or information carrying signal. The properties may be adjusted or changed by applying one or more of an electric field, an electric current, a magnetic field, electromagnetic energy, light, heat, mechanical stress or strain, acoustic and/or ultrasound energy to the material. Where the intercepting or interposing materials include optically-switched metamaterial elements, the methods may include applying an optical signal having a defined wavelength and/or intensity to change properties of the material. Where the intercepting or interposing materials include electrically and/or electro-magnetically-switched metamaterial elements, the methods may include applying an electrical or electro-magnetic signal to the metamaterial elements to change properties of the material.

The intercepting or interposing materials may have elements or portions (e.g., layers) that have switchable states including one or more of a reflective state a partly reflective state, a transmissive state, a partly transmissive state, a negative refractive index states, and/or a variable index state, etc. Methods 800-100 may include adjusting the material properties to switch a material element or portion between its states.

Methods 800-1100 may include varying properties of the intercepting or interposing material (e.g., an effective position of a selected spatial profile of an electromagnetic parameter, controllable reflective properties of the one or more layers, controllable indices of refraction of the one or more layers, controllable index of refraction, etc.) at a rate substantially different that an actual velocity v of the material and/or at a rate about equal to or greater than a modulation frequency of the incident electromagnetic wave. Further, the variations in the property may be that a portion of energy of the modified/reflected/transmitted electromagnetic wave has a frequency shifted in by a fixed amount, or a frequency translated outside a pre-defined frequency band of a receiver of the modified electromagnetic wave and/or outside a outside the frequency band width of the incident electromagnetic wave. Methods 800-1100 may include varying or changing the properties according to a random or pseudo-random pattern, a linear repeating pattern and/or a pattern having selected amplitude and frequency components so that for at least one incident electromagnetic wave frequency the modified electromagnetic wave is substantially phase-continuous. The properties may be varied at a rate sufficient to substantially reduce a phase correlation (e.g, temporal phase) of the incident and the modified electromagnetic waves and/or such that the modified electromagnetic wave is shifted in frequency by a fixed amount relative to the incident electromagnetic wave. In instances where the incident electromagnetic wave has a time-varying frequency [a chirp], method 800 may include varying the properties with a substantially different chirp rate than the incident electromagnetic wave.

Each of methods 800-100 may further include configuring the intercepting or interposing material to redirect the incident electromagnetic wave in a specified direction, for example, by including a retroreflector in the material. The retroreflector may, for example, be corner cube structures disposed in the material. Alternatively, properties of the intercepting or interposing material (e.g., index of refraction profiles) may be adjusted so that the material itself acts a retroreflector.

Each of methods 800-100 may also include coupling an electromagnetic radiation detector to the intercepting or interposing material and operating the combination as a demodulator and/or signal correlator. Alternatively or additionally, the methods may also include coupling a source of the incident electromagnetic wave to the intercepting or interposing material and operating the combination as a signal transmitter.

Methods 800-1110 may include providing reflective or partially reflective surface (e.g., reflector 550) disposed at the posterior or anterior of the intercepting or interposing materials. Alternatively or additionally, the methods may include adjusting the material properties to provide partially reflective surfaces or constructs inside the intercepting or interposing material. The methods may further include adjusting material properties so that the modified electromagnetic wave is effectively a sum of reflections from a first surface and a second surface. The methods may further include adjusting the material properties dynamically so that a relative amplitude (or other characteristics) of the reflections from the first surface and second surfaces are time-dependent. Methods 800-1110 may include dynamically adjusting the properties of the material elements, portions or layers to change an effective optical depth and/or angle of the reflector or an effective reflective surface presented to the incident electromagnetic signal. Methods 800-1110 may include dynamically adjusting the properties of the material elements, portions or layers in a repeating pattern (e.g., a linear saw tooth pattern).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that the term "substantially" is used herein generally as a term of approximation, but may be understood to be a term of magnitude if appropriate in the context of its use. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

The invention claimed is:

1. An apparatus, comprising:
   an artificially structured material having an adjustable spatial distribution of electromagnetic parameters configured to modify an incident free space electromagnetic wave; and
   a controller configured to dynamically adjust the spatial distribution of electromagnetic parameters in the material to introduce a time-varying path delay d (t) in the modified electromagnetic wave relative to the incident electromagnetic wave;
   wherein the spatial distribution of electromagnetic parameters in the material comprises a selected spatial profile of at least one electromagnetic parameter in the material; and
   wherein the controller is configured to dynamically vary an effective position of the selected spatial profile to time-modulate a property of the modified electromagnetic wave.

2. The apparatus of claim 1, wherein the controller is configured to dynamically change an effective position of the selected spatial profile to time-modulate a phase of the modified electromagnetic wave.

3. The apparatus of claim 1, wherein the controller is configured to vary the effective position of the selected spatial profile in response to an external signal.

4. The apparatus of claim 1, wherein the controller is configured to vary the effective position of the selected spatial profile over a distance comparable to a wavelength of the incident electromagnetic wave in the material.

5. The apparatus of claim 1, wherein the controller is configured to vary the effective position of the selected spatial profile in distance increments smaller than about 0.03 of a wavelength of the incident electromagnetic wave in the material.

6. The apparatus of claim 1, wherein the controller is configured to vary the effective position of the selected spatial profile in distance increments equal to or larger than 0.25 of a wavelength of the incident electromagnetic wave in the material.

7. The apparatus of claim 1, wherein the controller is configured to vary the effective position of the selected spatial profile so that a change in the phase of the modified electromagnetic wave is controlled with an accuracy of about $0.5*\pi$ radians.

8. The apparatus of claim 1, wherein the controller is configured to dynamically change the effective position of the selected spatial profile at a rate substantially different that an actual velocity v of the material.

9. The apparatus of claim 1, wherein the controller is configured to change the effective position of the selected spatial profile cyclically with a cycle frequency about equal to or greater than a modulation frequency of the incident electromagnetic wave.

10. The apparatus of claim 1, wherein the controller is configured to dynamically change the effective position of the selected spatial profile so that a portion of the energy of the modified electromagnetic wave has a frequency translated outside one or both of a pre-defined frequency band of a receiver of the modified electromagnetic wave and a frequency bandwidth of the incident electromagnetic wave.

11. The apparatus of claim 1, wherein the controller is configured to vary the effective position of the selected spatial profile according to a random or pseudo-random pattern.

12. The apparatus of claim 1, wherein the controller is configured to vary the effective position of the selected spatial profile so that a portion of the energy of the modified electromagnetic wave is shifted in frequency by a fixed amount relative to the incident electromagnetic wave so that the modified electromagnetic wave approximates a wave reflected from a surface moving continuously at velocity v.

13. The apparatus of claim 1, wherein the controller is configured to vary the effective position of the selected spatial profile according to a pattern having selected amplitude and frequency components so that for at least one incident electromagnetic wave frequency the modified electromagnetic wave is substantially phase-continuous.

14. The apparatus of claim 1, wherein the controller is configured to vary the effective position of the selected spatial profile according to a linear repeating pattern.

15. The apparatus of claim 1, wherein the incident electromagnetic wave has a time-varying frequency and wherein the controller is configured to dynamically vary the effective position of the selected spatial profile with a substantially different chirp rate than the incident electromagnetic wave.

16. The apparatus of claim 1, wherein the selected spatial profile of electromagnetic parameters in the material comprises a sequence of spatial steps arranged to act as a Bragg diffraction grating.

17. The apparatus of claim 1, wherein the selected spatial profile has a curved surface which focuses or defocuses the incident electromagnetic wave.

18. The apparatus of claim 1, wherein the selected spatial profile is interior to the material and defines an outward material layer extending from a spatial feature in the profile to an exterior surface of the material, and wherein the controller is configured to adjust the spatial distribution of electromagnetic impedance $\eta$ matching that of a medium across the exterior surface of the material.

19. The apparatus of claim 1, wherein the electromagnetic parameters include one or more of $\in$, $\mu$, $\eta$, $\sigma$, and n.

20. The apparatus of claim 1, wherein the selected spatial profile is a step profile.

21. An apparatus, comprising:
an artificially structured material having an adjustable spatial distribution of electromagnetic parameters configured to modify an incident free space electromagnetic wave; and
a controller configured to dynamically adjust the spatial distribution of electromagnetic parameters in the material to introduce a time-varying path delay d (t) in the modified electromagnetic wave relative to the incident electromagnetic wave;
wherein the time-varying path delay d (t) is a substantially continuous function of time over a time interval substantially larger than a cycle (1/f) of the incident electromagnetic wave.

22. The apparatus of claim 21, wherein the time-varying path delay d (t) is a substantially pseudo-random or random function of time.

23. The apparatus of claim 21, wherein the time-varying path delay d (t) is a substantially periodic function of time.

24. The apparatus of claim 21, wherein the function has a first order discontinuity.

25. The apparatus of claim 21, wherein the function has a second order discontinuity.

26. The apparatus of claim 21, wherein the material comprises a distribution of discrete man-made metamaterial elements providing the adjustable spatial distribution of electromagnetic parameters in the material.

27. The apparatus of claim 21, wherein the material comprises at least one layer switchable between a transmissive state and a reflective state.

28. The apparatus of claim 21, wherein the material comprises material switchable between a transmissive state and a reflective state in response to a control signal made of one or more of an electric field, an electric current, a magnetic field, an ultrasonic signal, mechanical stress or strain, an electromagnetic signal, and a light wave.

29. The apparatus of claim 21, further comprising, a retroreflector.

30. The apparatus of claim 29, wherein the retroreflector comprises corner cube structures disposed in the material.

31. The apparatus of claim 21, wherein the material is configured to act as a passive transponder.

32. The apparatus of claim 21, further comprising, an electromagnetic radiation detector, and wherein the apparatus is further configured to operate as a demodulator or signal correlator or both.

33. The apparatus of claim 21, wherein the controller is configured to modulate one or more of an amplitude, a direction, a phase, and a frequency of the incident electromagnetic wave according to an information carrying signal, the apparatus further comprising a source of the incident electromagnetic wave, wherein the source is coupled to the material so that the apparatus operates as a signal transmitter.

34. The apparatus of claim 21, wherein the electromagnetic parameters include one or more of $\in$, $\mu$, $\eta$, $\sigma$, and n.

35. An apparatus, comprising:
an artificially structured material having an adjustable spatial distribution of electromagnetic parameters configured to modify an incident free space electromagnetic wave; and
a controller configured to dynamically adjust the spatial distribution of electromagnetic parameters in the material to introduce a time-varying path delay d (t) in the modified electromagnetic wave relative to the incident electromagnetic wave;
wherein the spatial distribution of electromagnetic parameters in the material comprises a selected spatial profile of at least one electromagnetic parameter in the material; and
wherein the selected spatial profile of the at least one electromagnetic parameter in the material is configured to act as a reflector of the incident electromagnetic wave.

36. The apparatus of claim 35, wherein the selected spatial profile provides a partial reflection so that the modified electromagnetic wave is effectively a sum of reflections from a first surface and a second surface.

37. The apparatus of claim 36, wherein the controller is configured to dynamically vary a property of the selected spatial profile so that a ratio of the amplitudes of the reflections from the first and second surface is time-dependent.

38. The apparatus of claim 35, wherein the electromagnetic parameters include one or more of $\in$, $\mu$, $\eta$, $\sigma$, and n.

39. The apparatus of claim 35, wherein the selected spatial profile is a step profile.

40. A method, comprising:
intercepting an incident electromagnetic wave with an artificially structured material having an adjustable spatial distribution of electromagnetic parameters; and
dynamically adjusting the spatial distribution of electromagnetic parameters in the material to introduce a time-varying path delay d (t) in a modified electromagnetic wave relative to the incident electromagnetic wave; and
wherein the time-varying path delay d(t) is a substantially continuous function of time over a time interval substantially larger than a cycle of the incident electromagnetic wave.

41. The method of claim 40, wherein the time-varying path delay d(t) is a substantially pseudo-random or random function of time.

42. The method of claim 40, wherein the time-varying path delay d(t) is a substantially periodic function of time.

43. The method of claim 40, wherein the time-varying path delay d(t) is a substantially linear function of time (d(t)≈αt+β0) over a time interval substantially larger than a cycle (1/f) of the incident electromagnetic wave.

44. The method of claim 40, wherein the time-varying path delay d(t) is a substantially quadratic function of time (d(t) ≈αt2+βt+γ0) over a time interval substantially larger than a cycle (1/f) of the incident electromagnetic wave.

45. The method of claim 40, wherein dynamically adjusting the spatial distribution of electromagnetic parameters comprises one or more of a translation, a rotation, a tilt, a curvature change, a size and/or shape change of a selected spatial profile to time-modulate the phase of the modified electromagnetic wave.

46. The method of claim 40, wherein dynamically adjusting the spatial distribution of electromagnetic parameters comprises modulating an amplitude, a direction, a phase, and/or a frequency of the incident electromagnetic wave according to an information carrying signal.

47. The method of claim 40, wherein the electromagnetic parameters include one or more of ∈, μ, η, σ, and n.

48. The method of claim 45, wherein dynamically adjusting a spatial distribution of electromagnetic parameters comprises varying the effective position of the selected spatial profile in response to an external signal.

49. The method of claim 48, wherein varying an effective position of the spatial step comprises varying the effective position of the selected spatial profile so that the phase of the modified electromagnetic wave is controlled with an accuracy of about 0.06*π radians.

50. The method of claim 48, wherein varying an effective position of the selected spatial profile comprises varying the effective position of the selected spatial profile so that a is controlled with an accuracy of about 0.5*π radians.

51. The method of claim 48, wherein varying an effective position of the selected spatial profile comprises varying the effective position of the selected spatial profile at a rate substantially different that an actual velocity v of the material.

52. The method of claim 48, wherein varying an effective position of the selected spatial profile comprises varying the effective position of the selected spatial profile at a rate about equal to or greater than a modulation frequency of the incident electromagnetic wave.

53. The method of claim 48, wherein varying an effective position of the selected spatial profile comprises varying the effective position of the selected spatial profile so that a portion of energy of the modified electromagnetic wave has a frequency translated outside a pre-defined frequency band of a receiver of the modified electromagnetic wave and/or outside the frequency band width of the incident electromagnetic wave.

54. The method of claim 48, wherein varying an effective position of the selected spatial profile comprises varying the effective position of the selected spatial profile according to a random or pseudo-random pattern so as to substantially reduce or eliminated a temporal phase correlation of the incident and the modified electromagnetic waves.

55. The method of claim 48, wherein varying an effective position of the selected spatial profile comprises varying the effective position of the selected spatial profile so that the modified electromagnetic wave is shifted in frequency by a fixed amount relative to the incident electromagnetic wave so that the modified electromagnetic wave approximates a wave reflected from a surface moving continuously at velocity v.

56. The method of claim 48, wherein varying an effective position of the selected spatial profile comprises varying the effective position of the selected spatial profile according to a linear repeating pattern.

57. The method of claim 56, wherein the incident electromagnetic wave has a time-varying frequency, and wherein dynamically adjusting the spatial distribution of electromagnetic parameters comprises varying the effective position of the selected spatial profile with a substantially different chirp rate than the incident electromagnetic wave.

58. The method of claim 48, wherein the selected spatial profile is interior to the material and defines an outward material layer extending from the selected spatial profile to an exterior surface of the material, and wherein dynamically adjusting the spatial distribution of electromagnetic parameters comprises adjusting the spatial distribution of electromagnetic parameters in the material so that outward material layer has a desired interfacial property matching that of a medium across the exterior surface of the material.

\* \* \* \* \*